(12) United States Patent
Garretson

(10) Patent No.: US 12,311,829 B2
(45) Date of Patent: May 27, 2025

(54) LOAD STRAPPING DEVICE

(71) Applicant: Justin Garretson, Johnston, IA (US)

(72) Inventor: Justin Garretson, Johnston, IA (US)

( * ) Notice: Subject to any disclaimer, the term of this patent is extended or adjusted under 35 U.S.C. 154(b) by 0 days.

(21) Appl. No.: 18/305,798

(22) Filed: Apr. 24, 2023

(65) Prior Publication Data
US 2023/0256894 A1 Aug. 17, 2023

Related U.S. Application Data

(62) Division of application No. 16/948,145, filed on Sep. 4, 2020, now abandoned.

(60) Provisional application No. 62/896,673, filed on Sep. 6, 2019.

(51) Int. Cl.
*B60P 7/06* (2006.01)
*B60P 7/08* (2006.01)

(52) U.S. Cl.
CPC ............. *B60P 7/083* (2013.01); *B60P 7/0853* (2013.01)

(58) Field of Classification Search
CPC ............................. B60P 7/0853; B60P 7/083
See application file for complete search history.

(56) References Cited

U.S. PATENT DOCUMENTS

| 1,453,564 A | 5/1923 | Guenther | |
| 2004/0163216 A1* | 8/2004 | Simonson | B60P 7/083 24/68 CD |
| 2018/0154862 A1 | 6/2018 | Wedeking | |

* cited by examiner

*Primary Examiner* — Jason W San
*Assistant Examiner* — Michael S Lee
(74) *Attorney, Agent, or Firm* — McKee, Voorhees & Sease, PLC

(57) ABSTRACT

A load strapping device includes a ratchet device so the strap may be pulled through the mechanism uninterrupted. The ratcheting device has an entrance and exit on a common side of a housing of the device in which the load strap enters and exits to adjust the length of the device. A fixed length strap is attached at an opposite end to attach to a surface, and the movable strap is attached to a separate surface. The device is operated to move the strap through the housing to control the length of the strap between the surface connections to tighten or loosen the strap relative to the two surface connections.

14 Claims, 44 Drawing Sheets

LOAD STRAPPING DEVICE

CROSS REFERENCE TO RELATED APPLICATIONS

This application claims priority under 35 U.S.C. § 119 to provisional patent application U.S. Ser. No. 62/896,673, filed Sep. 6, 2019. The provisional patent application is herein incorporated by reference in its entirety, including without limitation, the specification, claims, and abstract, as well as any figures, tables, appendices, or drawings thereof.

This is a divisional patent application which claims priority under 35 U.S.C. § 120 to U.S. Ser. No. 16/948,145, filed Sep. 4, 2020.

TECHNICAL FIELD

The invention relates to load straps for securing cargo, particularly to the mechanism for tightening the strap and mechanism enclosure.

BACKGROUND

Tie down straps (also called ratchet straps, lashing straps or tie downs) are fasteners used to hold down cargo or equipment during transport. Tie down straps are essentially webbing that is outfitted with tie down hardware. This hardware allows the tie down strap to attach to the area surrounding the cargo or equipment, loop over the cargo or equipment, and/or attach to the cargo or equipment. It usually also includes a method of tensioning the strap, such as a ratchet.

A ratchet is a mechanical device that allows continuous linear or rotary motion in only one direction while preventing motion in the opposite direction. A rachet consists of a round gear or a linear rack with teeth, and a pivoting, spring-loaded finger called a pawl that engages the teeth. The teeth are uniform but asymmetrical, with each tooth having a moderate slope on one edge and a much steeper slope on the other edge. When the teeth are moving in the unrestricted direction, the pawl easily slides up and over the gently sloped edges of the teeth, with a spring forcing it into the depression between the teeth as it passes the tip of each tooth. When the teeth move in the opposite direction the pawl will catch against the steeply sloped edge of the first tooth it encounters, thereby locking it against the tooth and preventing any further motion in that direction.

A pawl is a mechanical component that engages with another component to prevent movement in one direction or prevent movement altogether. A roller clutch is a one-way clutch that transmit torque in one direction, while freewheeling or not moving in the opposite direction. A sprag clutch is a one-way freewheel clutch. It resembles a roller bearing but, instead of cylindrical rollers, non-revolving asymmetric figure-eight shaped sprags are used. When the unit rotates in one direction the rollers slip or free wheel, but when a torque is applied in the opposite direction, the rollers tilt slightly, producing a wedging action and binding because of friction. The sprags are spring-loaded so that they lock with very little backlash. A pivoted catch designed to fall into a notch on a ratchet wheel. It is a type of latch. It consists of a spring-loaded solid part that is pivoted at one end and engages the other component at a steep angle at the other end. Pawls are often tapered, being wide at the pivoting end and narrow at the engaging end.

Existing ratchet straps have a finite or limited ratcheting through-put of the strap due to the strap doubling on itself within the ratcheting mechanism. This is due to the use of spindle with a through-slot which allows it to receive said strap. This through-slot may be refenced as a Spanish windlass. The strap can only be ratcheted until the diameter about the windlass becomes large enough to interfere with the ratcheting handle.

Another issue when using existing ratchet straps is it rather easy to get a strap folded perpendicular to edge on itself during ratcheting causing the mechanism to bind. Existing load strapping devices can be difficult to unbound and release for removal, especially when fully wound and tensioned. Furthermore, existing load strapping devices may require both hands of an operator and finger dexterity to release the strap from tension.

Still additional issues include that existing ratchet straps are open to the environment, which can facilitate premature wear on components creating difficulty when ratcheting during load strapping, and also can cause the components to become damaged and render the device inoperable.

Therefore, there exists a need in the art for an improved tie down, which may be in the form of a ratchet strap, which overcomes or otherwise improves upon issues known in the art.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is therefore a primary object, feature, and/or advantage to overcome deficiencies in the art.

It is another object, feature, and/or advantage of the present invention to provide a load strapping device which has the ability to ratchet the full length of a strap.

It is another object, feature, and/or advantage of the present invention to provide a load strapping device which utilizes guides to keep the strap from folding on itself.

It is another object, feature, and/or advantage of the present invention to provide a load strapping device which releases in single action, one hand operation, and no doubled over bound strap to unwind.

It is another object, feature, and/or advantage of the present invention to provide a load strapping device wherein the ratcheting mechanism is enclosed and substantially weather proof.

It is another object, feature, and/or advantage of the present invention to provide a load strapping device wherein the strap does not require unwinding or threading of strap before using the ratchet device.

It is still yet a further object, feature, or advantage of the present invention to provide an apparatus that may be used in a wide variety of applications.

It is still yet a further object, feature, or advantage of the present invention to provide an apparatus that improves safety.

It is still yet a further object, feature, or advantage of the present invention to provide an apparatus that is cost effective.

It is still yet a further object, feature, or advantage of the present invention to provide an apparatus that is reliable and durable and has a long usable life.

It is still yet a further object, feature, or advantage of the present invention to provide an apparatus which is easily used and reused.

It is still yet a further object, feature, or advantage of the present invention to provide an apparatus that is easily manufactured, assembled (installed), disassembled (uninstalled), repaired, replaced, stored, transported, and cleaned.

It is still yet a further object, feature, or advantage of the present invention to provide an apparatus that is aesthetically pleasing.

It is still yet a further object, feature, or advantage of the present invention to incorporate an apparatus into a system accomplishing some or all of the previously stated objectives.

It is still yet a further object, feature, or advantage of the present invention to provide methods of [using/manufacturing/installing/repairing] an apparatus accomplishing some or all of the previously stated objectives.

These or other objects, features, and advantages of the present invention will be apparent to those skilled in the art after reviewing the following detailed description of the illustrated embodiments, accompanied by the attached drawings.

BRIEF DESCRIPTION OF THE DRAWINGS

The appended claims set forth those novel features, which characterize the invention. However, the invention itself, as well as further objects and advantages thereof, will best be understood by reference to the following detailed description of an embodiment taken in conjunction with the accompanying drawings, where like reference characters identify like elements throughout the various figures.

Figure 1:
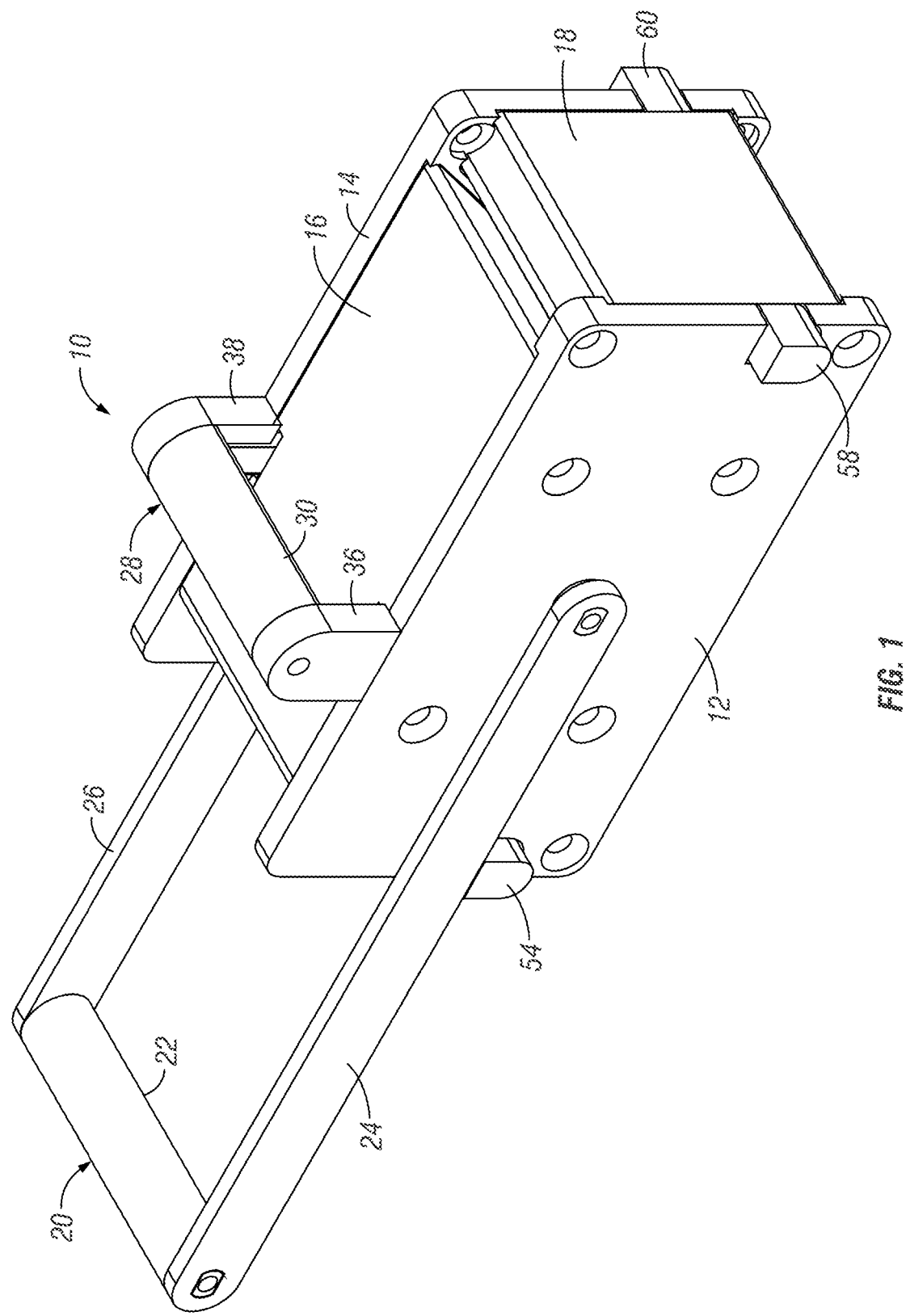
FIG. 1 is an isometric view of a load strapping device according to aspects of the invention.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is synonymous with "and/or" and is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, angle, wave length, frequency, voltage, current, and electromagnetic field. Furthermore, there is certain inadvertent error and variation that is likely through differences in the manufacture, source, or purity of the components used to make or carry out the present invention. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Numerical adjectives and adverbs (e.g., first, second, etc.), positional adjectives and adverbs (e.g., vertical, horizontal, forward, aft, etc.), nouns referencing a portion of or orientation of an object (e.g., top, bottom, sides, etc.), and the like are referenced according to the views presented. These terms are used only for purposes of description and are not limiting unless these terms are expressly included in the claims. The physical configuration of an object or a combination of objects may change without departing from the scope of the present invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

Figure 2:
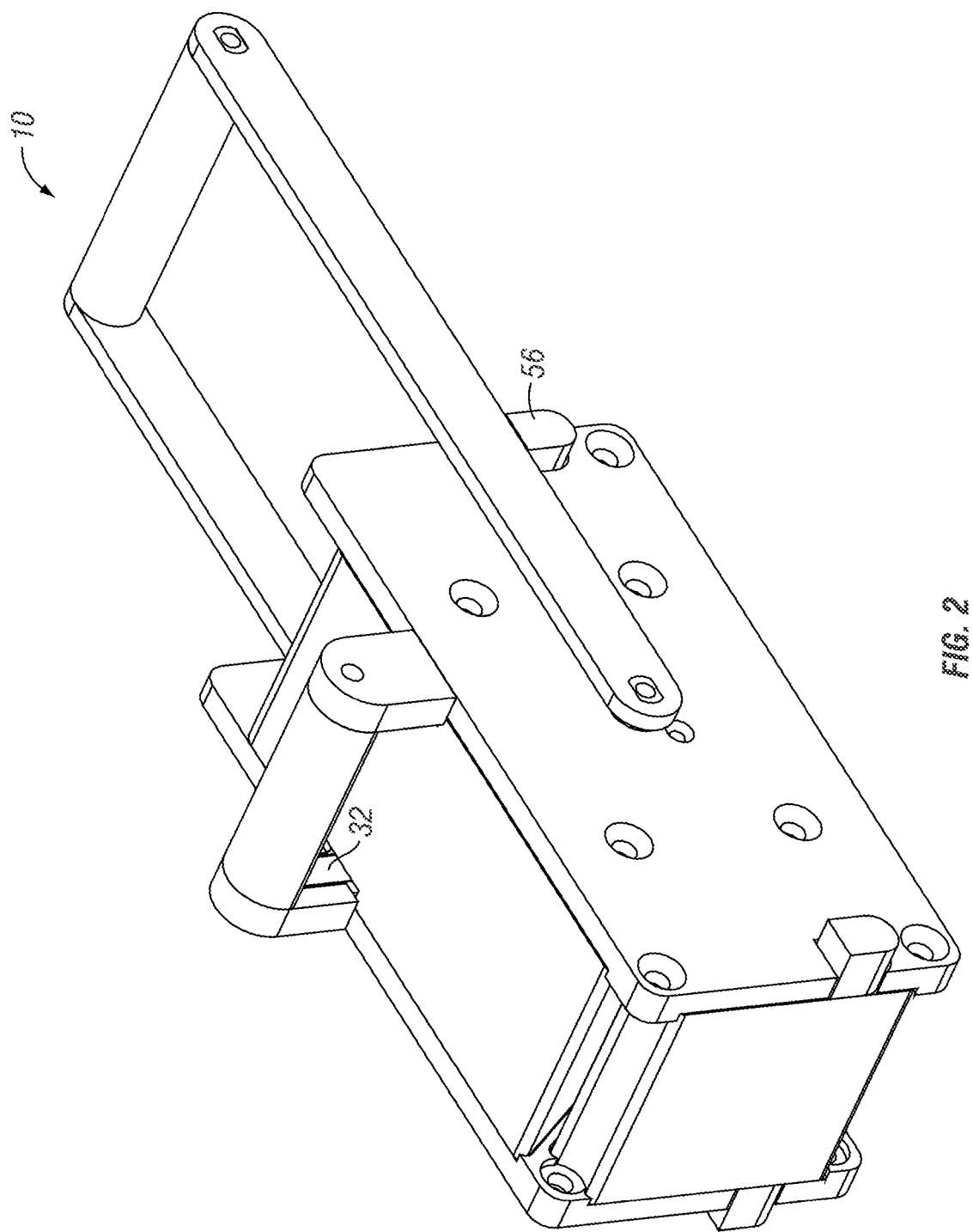
FIG. 2 is another isometric view a load strapping device according to aspects of the invention.
Figure 3:
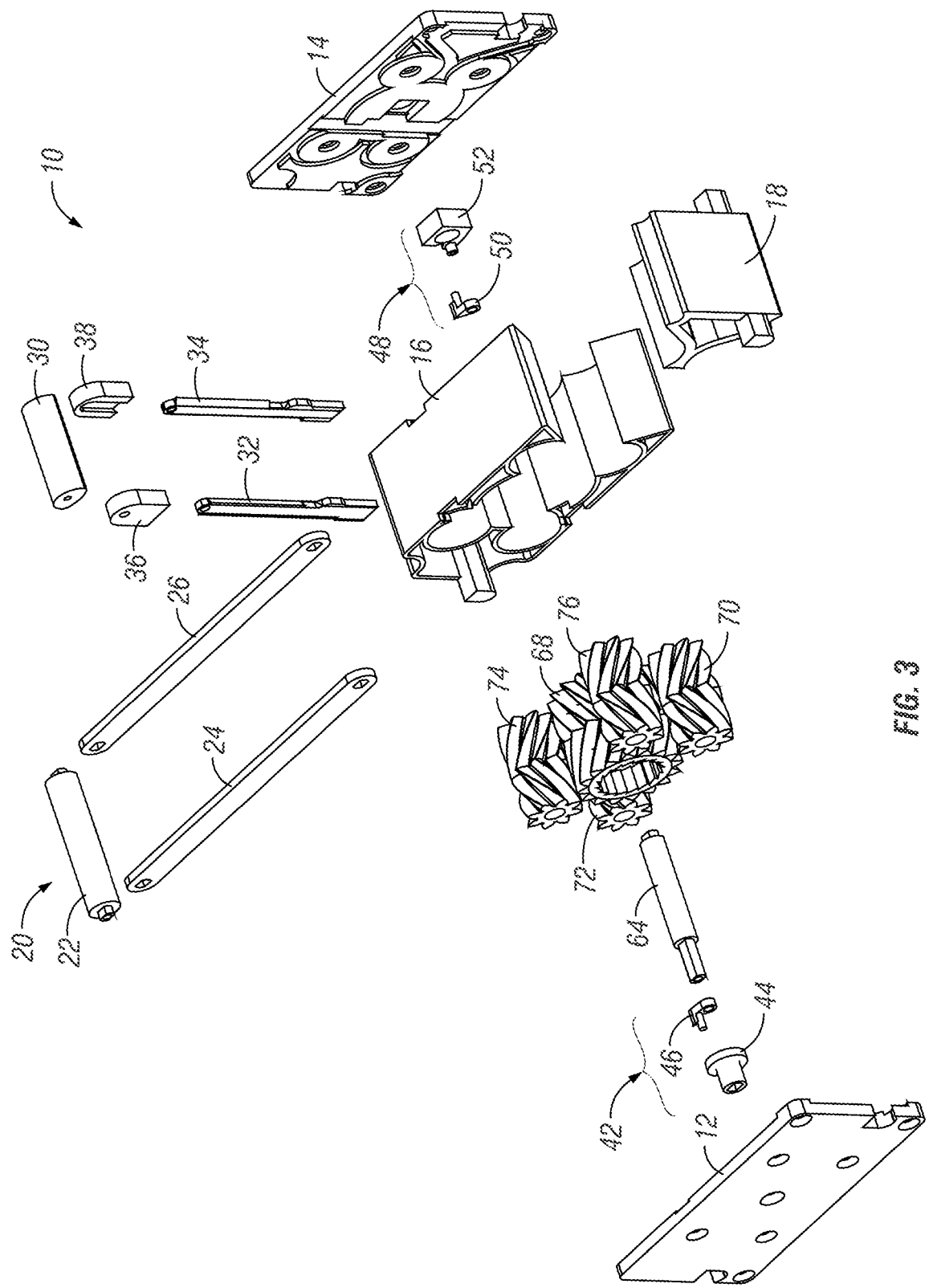
FIG. 3 is an exploded view of a load strapping device.

FIGS. 1-3 illustrate the components of a load strapping device 10. The Load Strapping Device 10 is comprised of a ratchet handle assembly 20, a release assembly 28, a ratchet drive assembly 42, a ratchet stop assembly 48, a body, idler gears 70, 72, 74, and 76, a drive gear 68, and an axle 64. The body of the device is comprised of a front plate 12, back plate 14, left guide 16, and right guide 18. The device 10 is fastened together using internally threaded spacers (not shown) and spindles not shown (not shown). Screws (not shown) enter through front plate 12 and back plate 14 and are threaded into each spacer and spindle (not shown). However, it should be appreciated that other mechanical fastening members could be utilized in place or in combination with the spacers and/or screws. It is also envisioned that the components of the body could be welded or otherwise adhered to one another. Spindles are utilized within each idler gear. Ratchet handle assembly 20 is comprised of the handlebar 22, front arm 24, and back arm 26. The handlebar 22 is fixedly connected to the arms 24, 26, but could also be constructed to be rotatably connected thereto. Ratchet handle assembly 20, and particularly front arm 24, utilizes front left stop 54 and a front right stop 56 to control handle assembly 20 motion. Ratchet handle assembly 20, and particularly back arm 26 utilizes back left stop 58 and a back right stop 60 to control handle assembly 20 motion. Specifically, arm stops 54, 56, 58, and 60 allow ratchet handle assembly 20 to maintain a controlled motion when ratcheting gear strap 202 through device 10, as well as a resting or holding position. The stops provide end points for the movement of the handle 20 during rotation thereof to activate the device 10.

Figure 15:
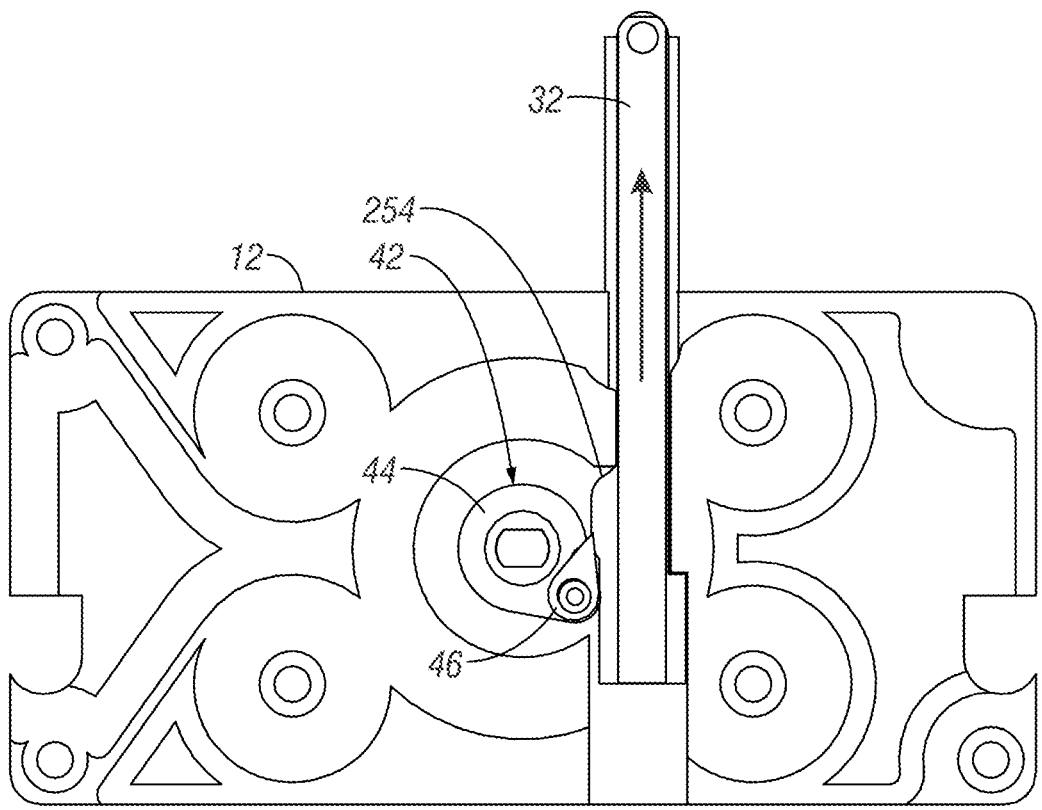
FIG. 15 is a back view of the front plate showing the drive assembly disengaged.

Release assembly 28 is comprised of a release bar 30, a front pole 32, and a back pole 34. Release assembly 28 also has a front stop 36 and a back stop 38. The release assembly 28 is movable in generally linear manner, which may be up/down relative to the body of the device 10. The linear movement is constrained both by the length of the poles 30, 32 and the stops 36, 38. The release assembly 28 controls the ratchet between locked and unlocked configurations, based upon the movement and engagement of the components. The ratcheting position for front stop 36 and back stop 38 is as shown in FIGS. 1 and 2, with the stops resting in contact or at least near contact on the front plate 12 and back plate 14 as well as left guide 16. The non-ratcheting position is up and away from contact on front plate 12 and back plate 14 as well as left guide 16 (see, e.g., FIG. 15). An axle 64 is positioned generally within the drive gear 68. As will be understood, the axle 64 is connected to the handle assembly 20, wherein rotational movement of the handle assembly 20 will correspondingly rotate the axle 64, which in turn drives the drive gear 68 and corresponding components. Drive assembly 42 comprises drive pawl arm 44 and drive pawl 46. The axle 64 also mates with stop assembly 48. Stop assembly 48 comprises a stop pawl 50 and stop pawl pedestal 52. The drive pawl arm 44 is driven by the handle 24 to provide rotation thereto. The drive pawl arm 44 drives the drive pawl 46, which is configured to be rotated with the drive pawl arm 44. The drive pawl 46 is shaped so as to allow the gear to rotate in a first direction. However, if the gear is attempted to rotate in the opposite direction, the pawl will prevent the rotation. This allows the ratcheting of the mechanism to tighten the strap while holding the strap in place. The gear teeth may be uniform but asymmetrical, with each tooth having a moderate slope on one edge and a much steeper slope on the other edge.

When the teeth are moving in the unrestricted (i.e. forward) direction, the pawl easily slides up and over the gently sloped edges of the teeth, with a spring or other biasing member forcing it (often with an audible 'click') into the depression between the teeth as it passes the tip of each tooth. When the teeth move in the opposite (backward) direction, however, the pawl will catch against the steeply sloped edge of the first tooth it encounters, thereby locking it against the tooth and preventing any further motion in that direction.

In addition, while the stop assembly including the stop pawl and pedestal 52 are shown, it should be appreciated that generally any type of backstop could be used to prevent or otherwise mitigate the unwanted movement of the components. This could include a clutch, sprag, wheel, lock, or the like.

Figure 4:
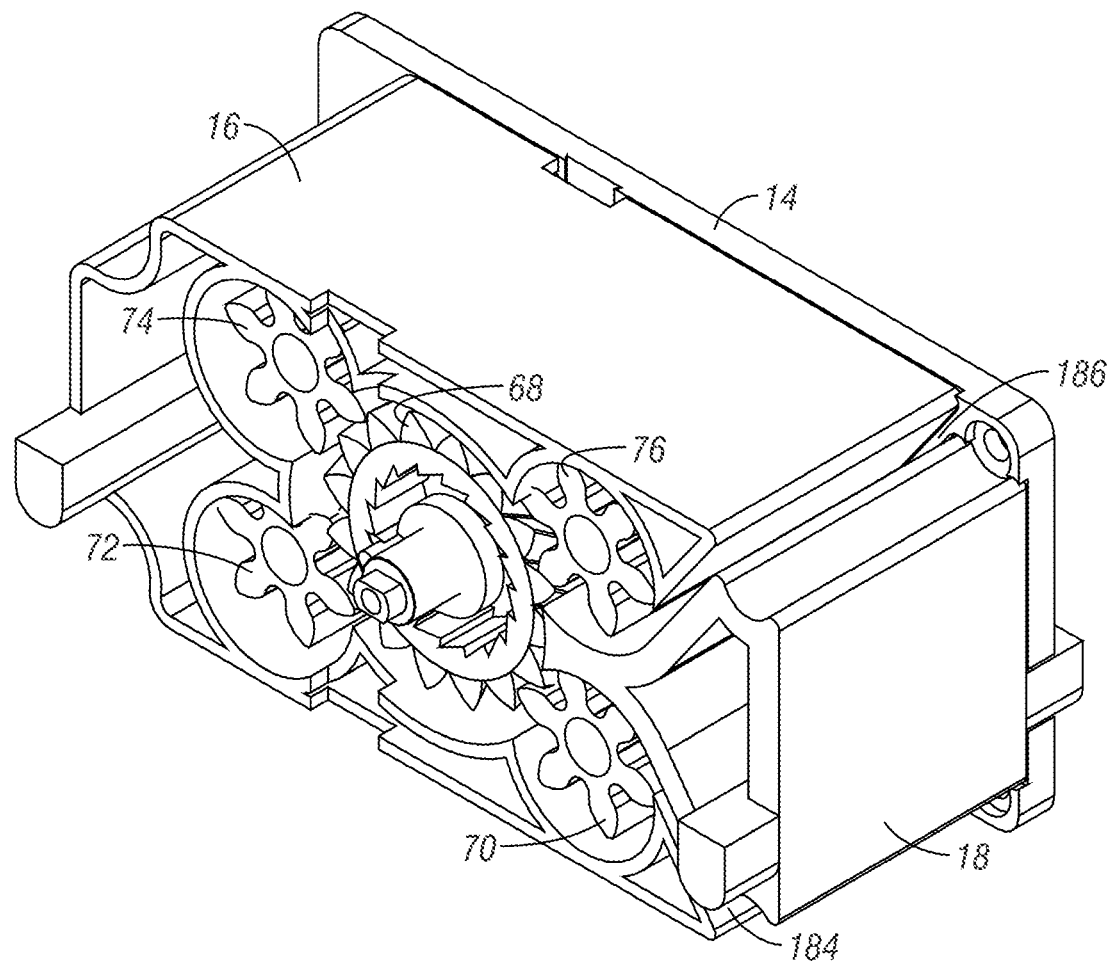
FIG. 4 is sectional view of the load strapping device according to aspects of the invention.
Figure 5:
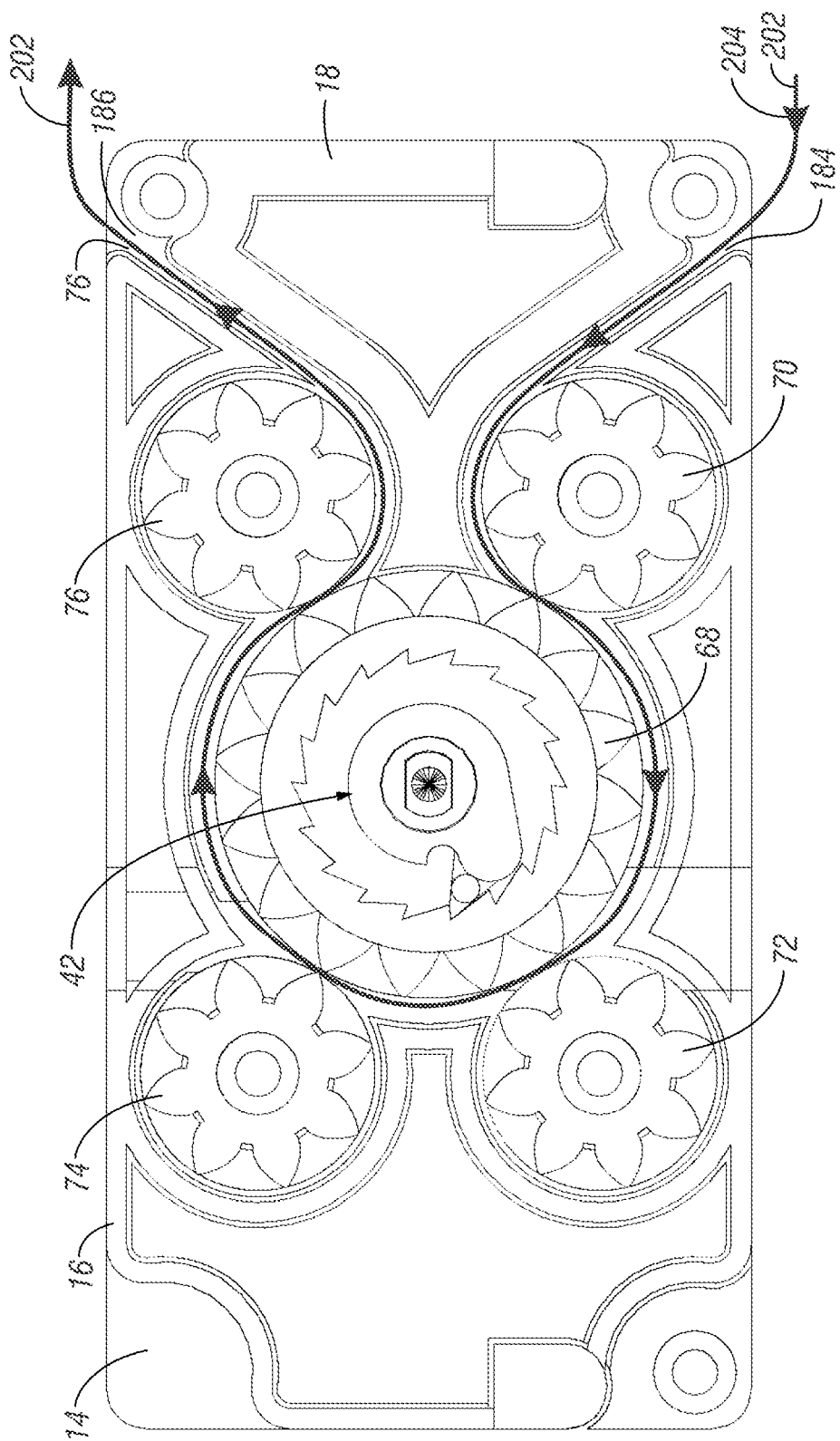
FIG. 5 is a cross-sectional view of the load strapping device showing the strap pathway within the load strapping device.

FIGS. 4-5 illustrate the load strap or gear strap 202 pathway 204, which is shown as an arrowed line, through the device 10. Right guide 18 is shaped to interface with left guide 16 to form strap entry slot 184 and strap exit slot 186, respectively. As shown best in FIG. 5, the right guide 18 includes angled or sloped surfaces that dovetail together. The upper sloped surface designates a portion of the exit slot 186, and the lower sloped surface designates a portion of the entry slot 184. The sloped surfaces also correspond with angled/sloped portions of the left guide 16, defining a passage between the surfaces for the strap 202 to pass. Front plate 12 and back plate 14 provide strap 202 a guide surface perpendicular to left guide 14 and right guide 16 entry slot 184 and exit slot 186.

Strap entry slot 184 guides the strap towards first idler gear 70. The strap engages first idler gear 70 and, due in part to the shape of the dovetailed portion of the right guide 18, begins to rotate towards drive gear 68. The clearance between drive gear 58 and first idler gear is approximately 4.5 mm, likewise idler gears 72, 74, and 76 have the same clearance relative to drive gear 68, i.e., 4.5 mm. Gear strap 202 can compress to approximately 2.0 mm.

It should be appreciated that the clearance values provided herein are to be considered exemplary, and not limiting. The thicknesses, clearances, and the like between the components of the invention should be understood to be a function of the strap thickness that allows enough friction to pull the strap, but not too much as it binds the gears. Therefore, the clearance values could be generally any value related to said strap thickness, and all strap thicknesses should be considered to be covered by the disclosed invention.

The gear drive 68 and idler gear 70 mesh together allowing strap 202 to be pulled through device 10. The left guide 16 includes interior, curved portions that also aid in positioning and moving the strap 202 through the gears and device, and includes a tolerance to as to discourage the strap from folding upon itself while in the device.

Ratchet handle assembly 20 is rotated from its resting position (shown in FIGS. 1-2), thus pulling gear strap 202 through device 10 as shown by the arrows of the strap pathway 204. Drive assembly 42 ratchets when handle assembly 20 rotates from left to right (in FIG. 5) and rotates drive gear 68, which is an internally toothed wheel that converts an oscillating motion to an intermittent circular motion. Four idler gears 70, 72, 74, and 76 are shown. Only idler gear 70 is needed for operation of the device, as the drive gear 68 and idler gear 70 provide movement of the strap 202 through the device. Adding the 2nd, 3rd, and 4th idlers increases surface area on load strap 202 and thus a greater tension may be applied and maintained on a load. Idler gears 70, 72, 74, and 76 are radially spaced equally around drive gear 68, and as noted, are not driven. Instead, they provide surfaces for the strap to compress against and contact when the drive gear 68 is activated to aid in moving the strap along the path. FIGS. 8, 9, 12, and 13 further illustrates guide surfaces for gear strap 202 pathway 204. FIG. 9 shows the strap entry 184 leading to first idler gear surface 122, drive gear surface 120, second idler gear surface 124, third idler gear surface 126, drive gear surface 120, fourth idler gear surface 128, and towards the strap exit 186. Likewise, FIG. 13 shows strap entry 184 leading to first idler gear surface 152, drive gear surface 150, second idler gear surface 154, third idler gear surface 156, drive gear surface 150, fourth idler gear surface 158, and towards the strap exit 186. Guide surfaces 120, 122, 124, 126, 128, 150, 152, 154, 156, and 158 also mate fittingly with drive gear 68 and idler gears 70, 72, 74, and 76 and thus keep gear strap 202 from folding on itself and creating an obstruction and jamming.

Figure 6:
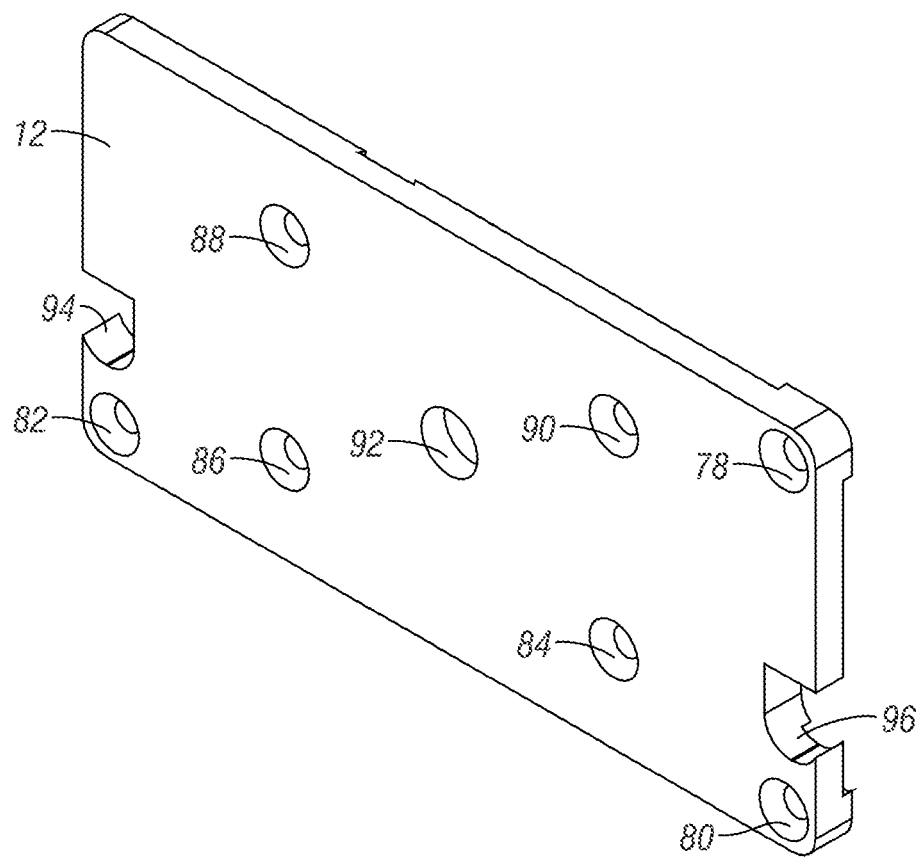
FIG. 6 is an isometric view of the front panel of a load strapping device.
Figure 7:
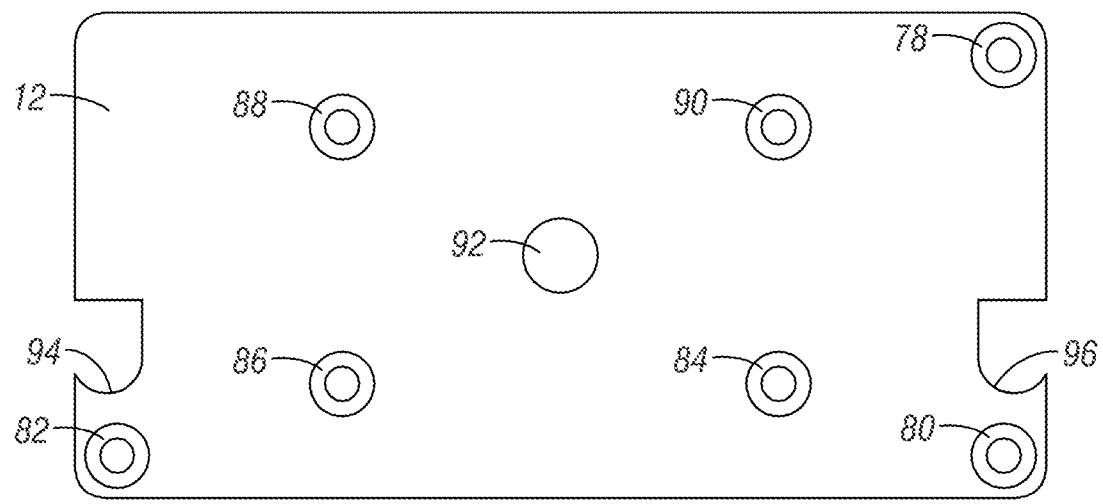
FIG. 7 is a front view of the front panel of a load strapping device.

FIGS. 6-7 illustrate the front plate 12 as viewed from the outside. Screw holes 78, 80, and 82 are for securing a first spacer, a second spacer, and a third spacer respectively (spacers not shown) to the front plate 12. Each spacer is utilized to maintain optimally designed spacing between front plate 12 and back plate 14. Each spacer is cylindrically shaped but may be hexagonally shaped with internal threading at each end to receive a screw. Screw holes 84, 86, 88, and 90 are for securing a first idler gear 70, a second idler gear 72, a third idler gear 74, and a fourth idler gear 76 to the front plate 12. If second, third and/or fourth idler gears are not utilized, a round shaped spacer may replace the idler gear within load strapping device 10. Each idler gear is utilized to maintain optimally designed spacing between front plate 12 and back plate 14. Further, the left guide 16 may enclose the open space created of each non-utilized idler gear. Also, bearing surface 92 supports and allows drive assembly 42 and drive axle 64 to protrude through front plate 12 to enable fixation to front arm 24. All screw holes are shown as countersunk but need not be countersunk.

Figure 10:
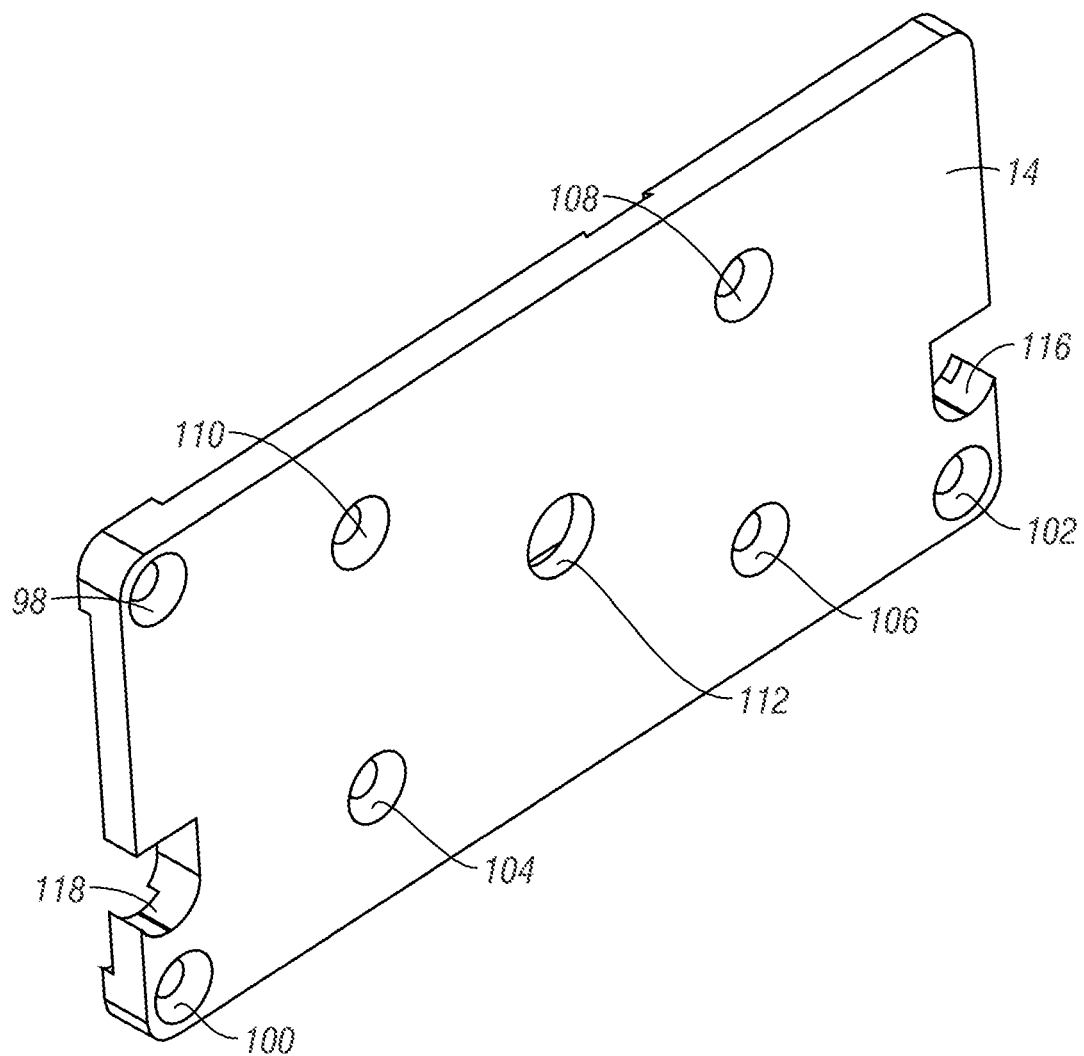
FIG. 10 is an isometric view of the back panel of a load strapping device.
Figure 11:
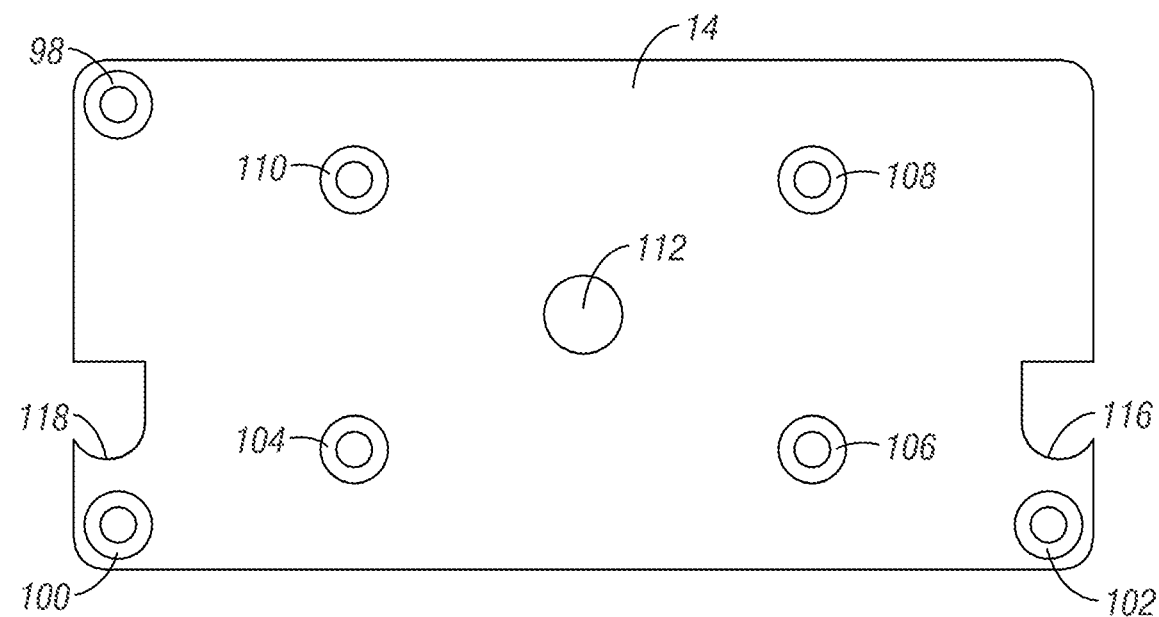
FIG. 11 is a front view of the back panel of a load strapping device

FIGS. 10-11 illustrate the back plate 14 as viewed from the outside. Screw holes 98, 100, and 102 are for securing a first spacer, a second spacer, and a third spacer respectively (spacers not shown) to the back plate 14. Each spacer is utilized to maintain optimally designed spacing between back plate 14 and front plate 12. Each spacer is cylindrically shaped but may be hexagonally shaped with internal threading at each end to receive a screw. Screw holes 104, 106, 108, and 110 are for securing a first idler gear 70, a second idler gear 72, a third idler gear 74, and a fourth idler gear 76 to the back plate 14. If second, third and/or fourth idler gears are not utilized, a round shaped spacer will replace the idler gear within load strapping device 10. Each idler gear is utilized to maintain optimally designed spacing between back plate 14 and front plate 12. Further, the left guide 16 may enclose the open space created of each non-utilized idler gear. Also, opening 112 allows drive axle 64 to protrude through back plate 14 to enable fixation to back arm 26. All screw holes are shown as countersunk but need not be countersunk. The third spacer (not shown) is where a short strap and hook (not shown) are permanently attached.

Figure 8:
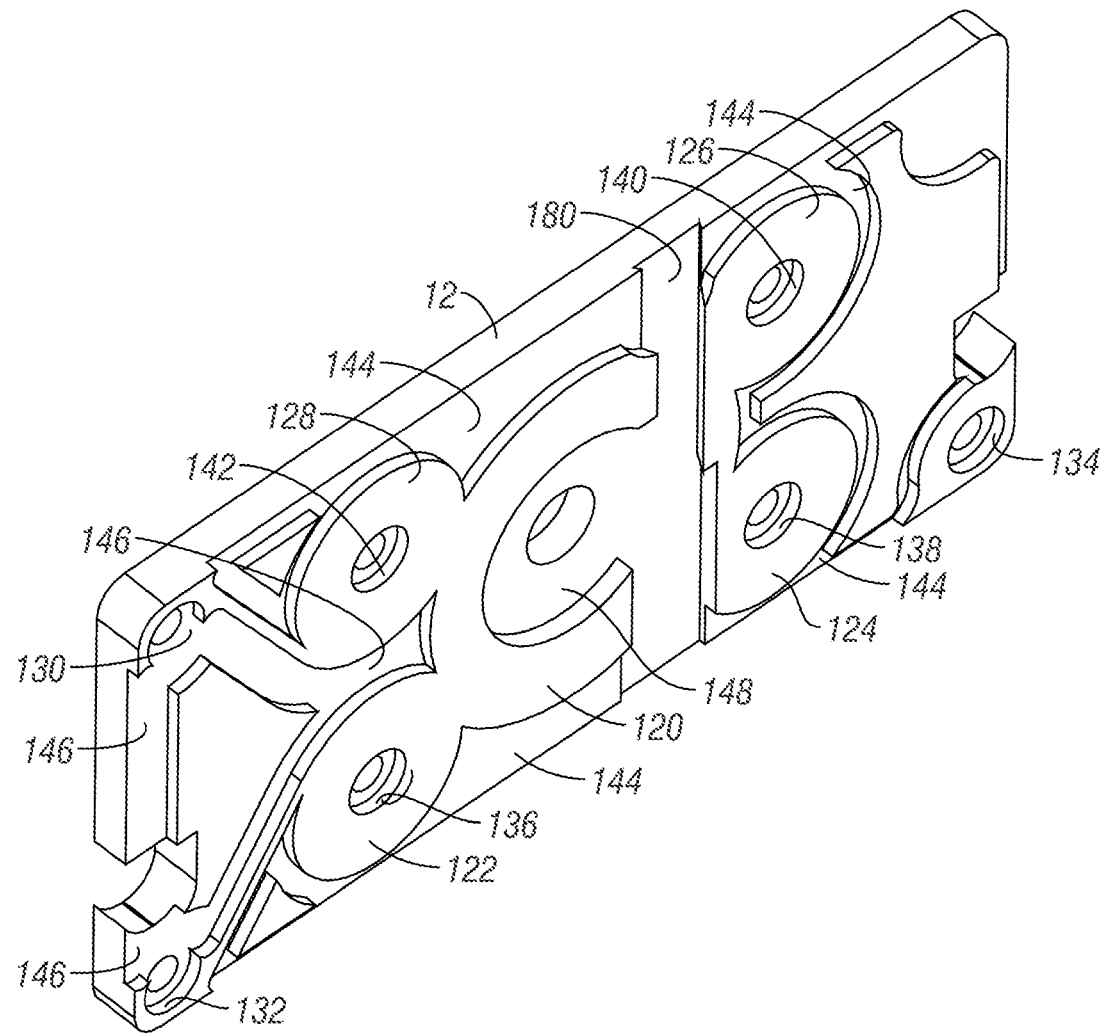
FIG. 8 is an isometric view of the front panel of a load strapping device.
Figure 9:
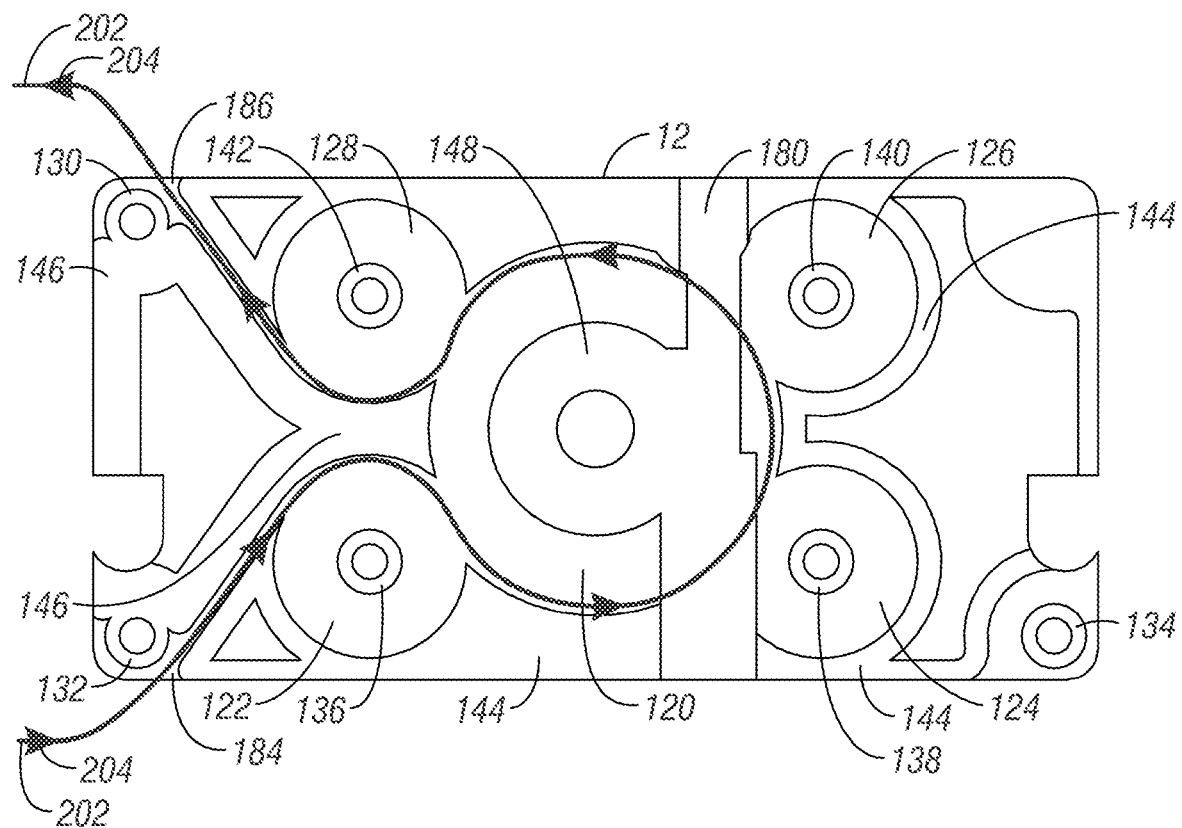
FIG. 9 is a rear view of the front panel of a load strapping device.
Figure 14:
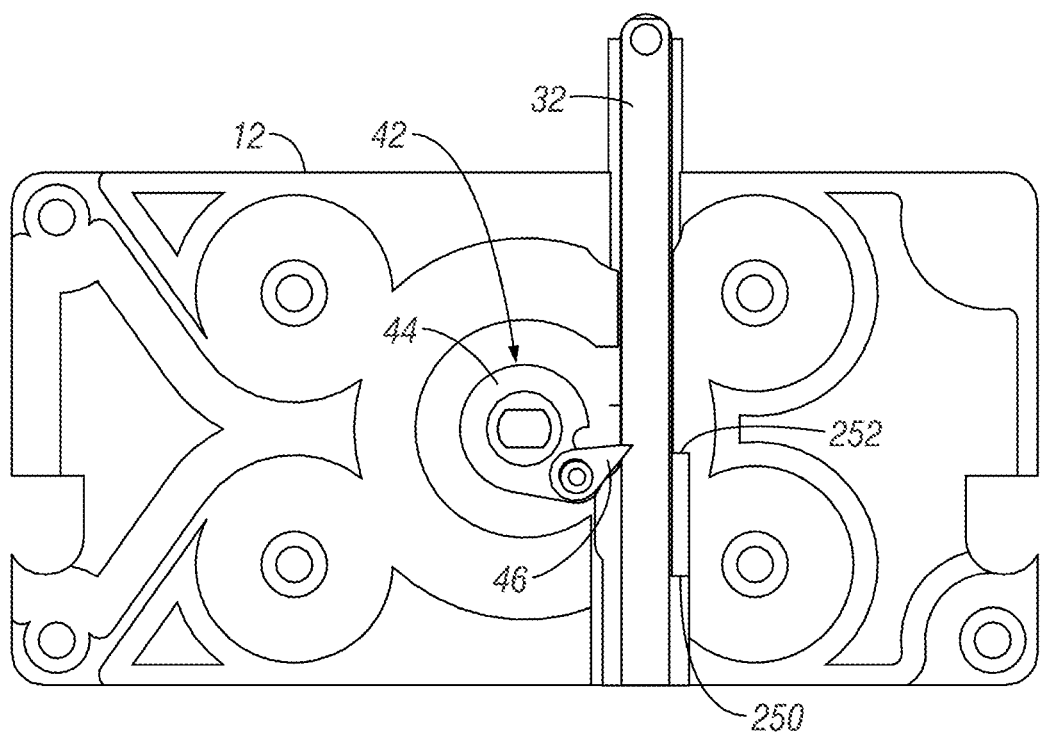
FIG. 14 is a back view of the front plate showing the drive assembly engaged.

FIGS. 8-9 illustrates front plate 12 as seen from inside the device 10. Recesses 130, 132, and 134 receive a first spacer, a second spacer, and a third spacer respectively (spacers not shown) to front plate 12. Wherein, each spacer being utilized to maintain optimally designed spacing between front plate 12 and back plate 14. Each spacer is cylindrically shaped but may be hexagonally shaped with internal threading at each end to receive a screw. Recesses 136, 138, 140, and 142 are for securing a first idler gear spindle, a second idler gear spindle, a third spindle, and a fourth idler gear spindle respectively (spindles not shown) to front plate 12. Wherein, each spindle being utilized to maintain optimally designed spacing between front plate 12 and back plate 14. Each spindle is cylindrically shaped and threaded at each end to receive a screw. The spindle allows the idler gear to freely rotate. Further, the spindle extends beyond the idler gear length equal to the depth of the recess. The recess aids in securing and stabilizing each spindle. If second, third, and/or fourth idler gears are not utilized, a spindle will replace the idler gear within load strapping device 10. Wherein, each idler gear being utilized to maintain optimally designed spacing between front plate 12 and back plate 14. Further, left guide 16 may enclose the open space created by each non-utilized idler gear. Recess 148 creates a space for drive assembly 42, see, e.g., FIGS. 14-15. Recesses 144 and 146 function as a dado joint utilized by woodworkers. A dado is a very functional and strong method for connecting two pieces; made stronger with screws. This method also creates a seal tight enclosure which protects the internal components. Recess 144 accepts left guide 12 and recess 146 accepts right guide 14. Recess 180 accepts front pull 32. The upper area of recess 180 is trapezoid shaped, thus securing front pull 32 by preventing movement front to back, refer to FIG. 14.

Figure 12:
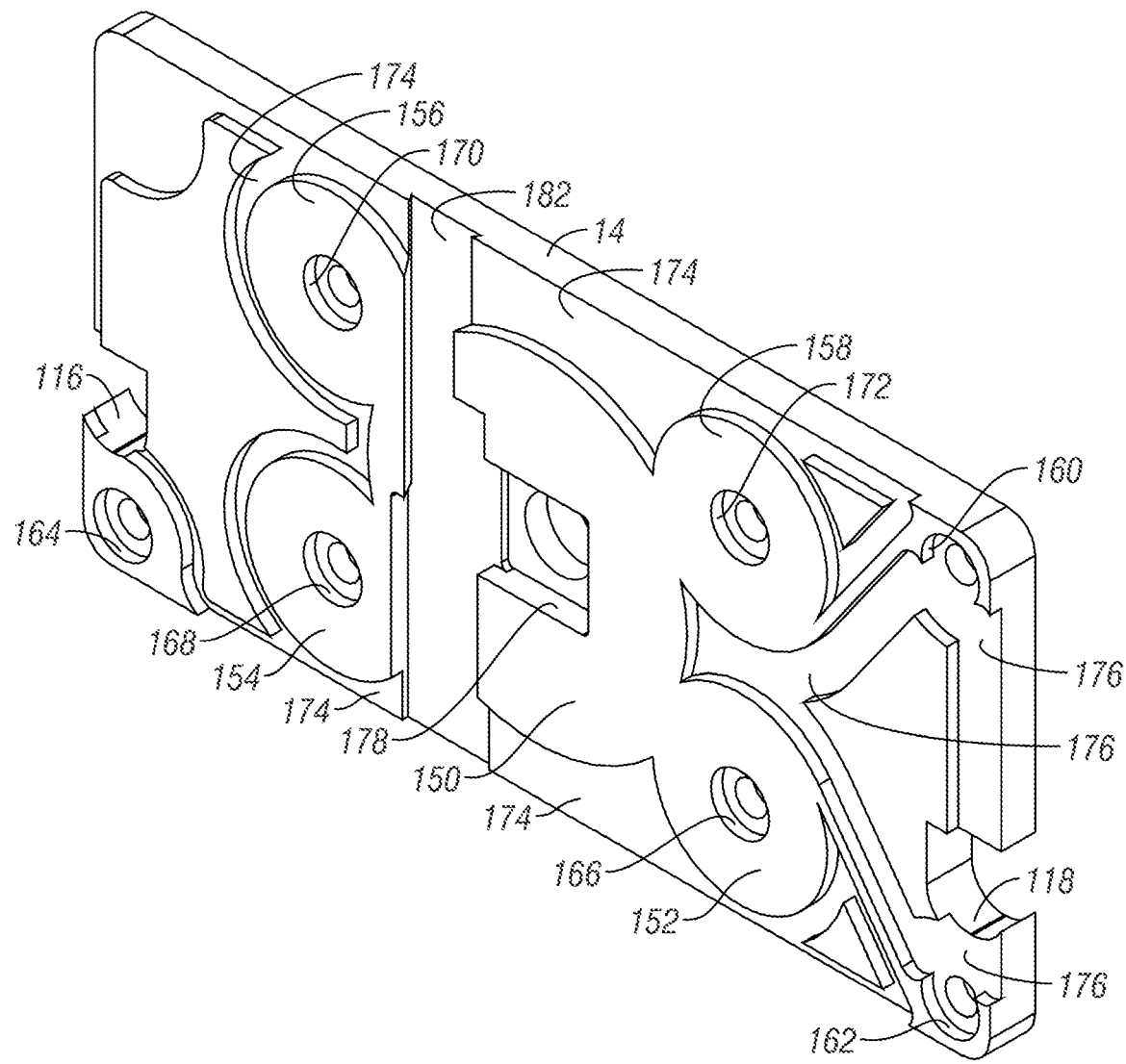
FIG. 12 is an isometric back view of the back panel of a load strapping device.
Figure 13:
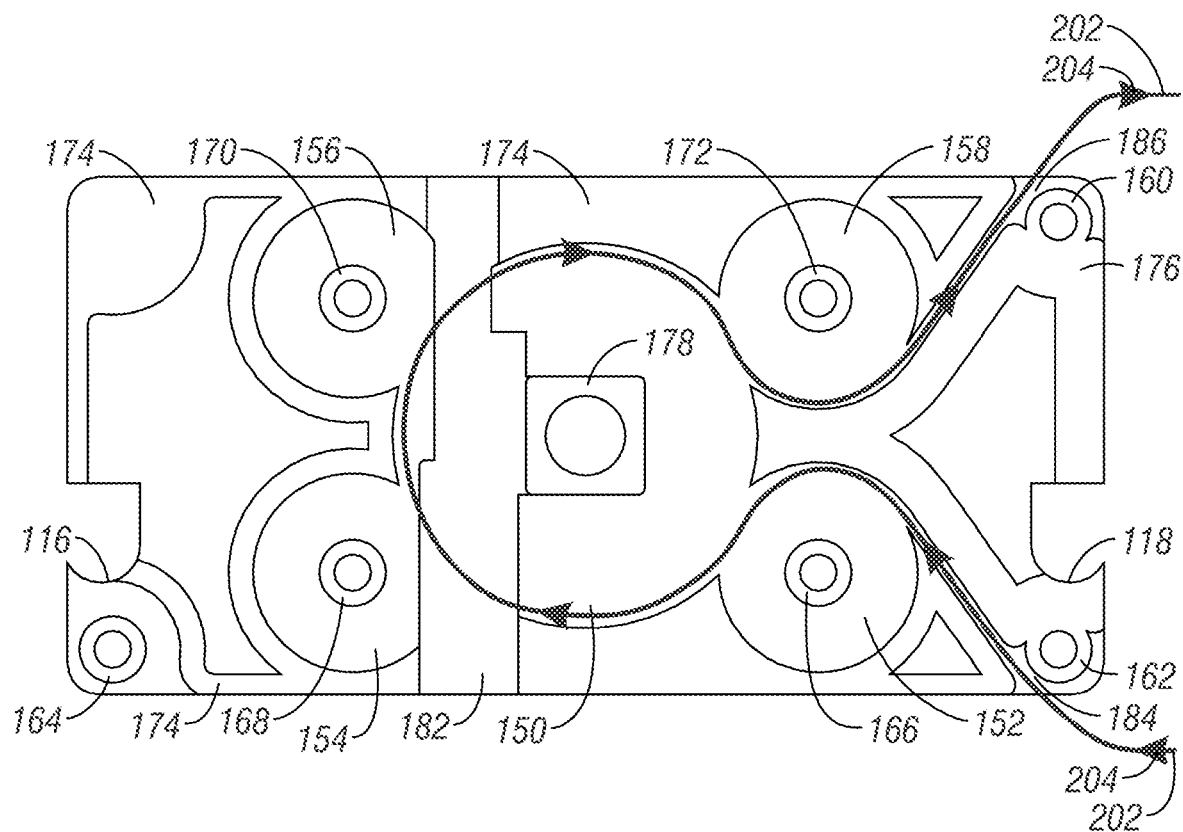
FIG. 13 is a back view of the back panel of a load strapping device.
Figure 16:
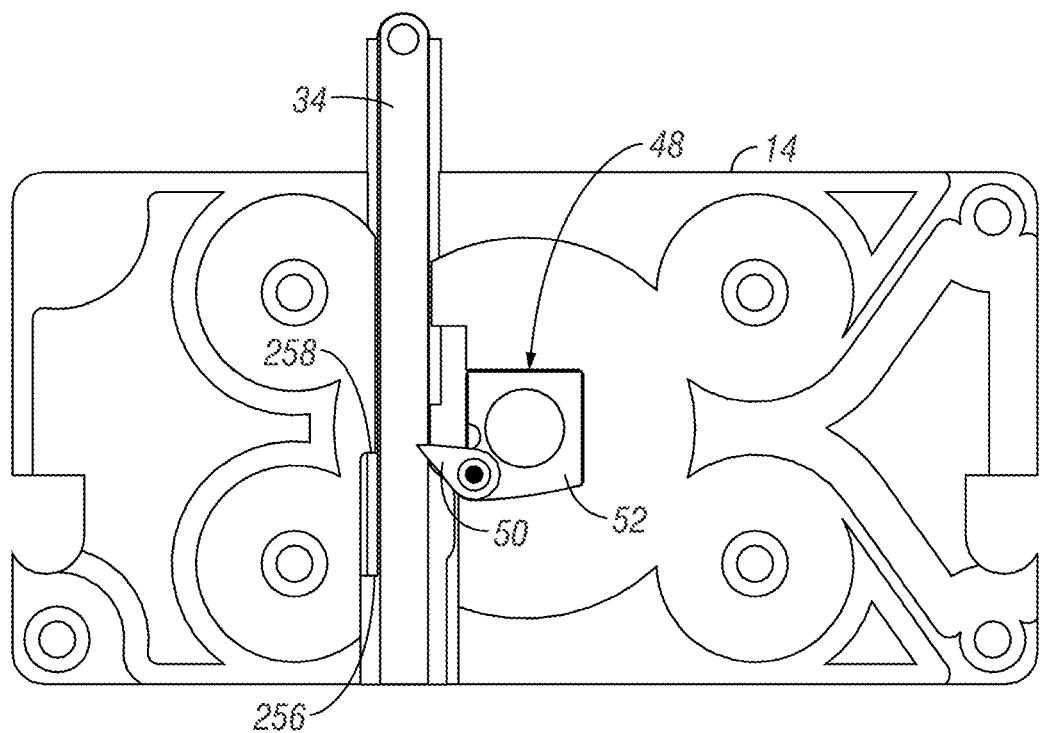
FIG. 16 is a front view of the back plate showing the stop assembly engaged.
Figure 17:
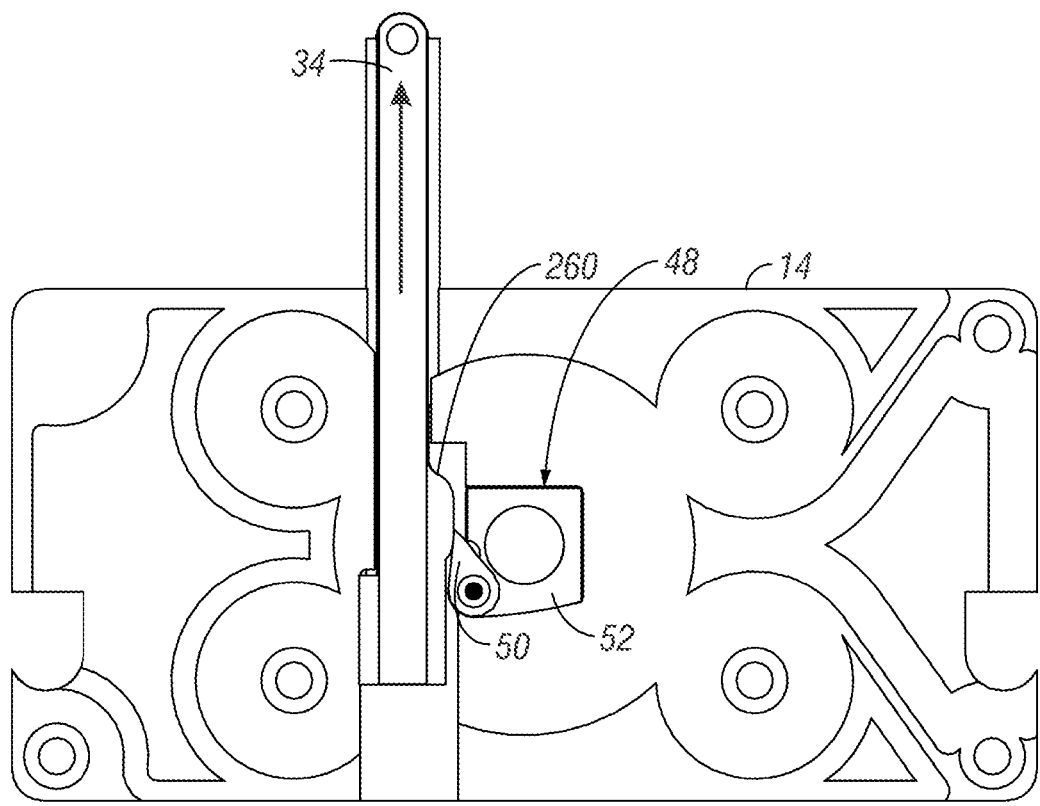
FIG. 17 is a front view of the back plate showing the stop assembly disengaged.

FIGS. 12-13 illustrates back plate 14 as seen from inside device 10. Recesses 160, 162, and 164 receive a first spacer, a second spacer, and a third spacer respectively (spacers not shown) to back plate 14. Wherein, each spacer being utilized to maintain optimally designed spacing between back plate 14 and front plate 12. Each spacer is cylindrically shaped but may be hexagonally shaped (or any other geometric shape capable of meeting the other functionalities of the disclosure) with internal threading at each end to receive a screw. Recesses 166, 168, 170, and 172 are for securing a first idler gear spindle, a second idler gear spindle, a third spindle, and a fourth idler gear spindle respectively (spindles not shown) to back plate 14. Wherein, each spindle being utilized to maintain optimally designed spacing between back plate 14 and front plate 12. Each spindle is cylindrically shaped and threaded at each end to receive a screw. The spindle allows the idler gear to freely rotate. Further, the spindle extends beyond the idler gear length equal to the depth of the recess. The recess aids in securing and stabilizing each spindle. If second, third, and/or fourth idler gears are not utilized, a spindle will replace the idler gear within load strapping device 10. Wherein, each idler gear being utilized to maintain optimally designed spacing between back plate 14 and front plate 12. Further, left guide 16 may enclose the open space created by each non-utilized idler gear. Recess 178 accepts stop pawl pedestal 52, see, e.g., FIGS. 16-17. The square shape secures stop pawl pedestal 52 from rotating. Recesses 174 and 176 function as a dado joint utilized by woodworkers. A dado is a very functional and strong method for connecting two pieces; made stronger with screws. This method also creates a seal tight enclosure which protects the internal components. Recess 174 accepts left guide 12 and recess 176 accepts right guide 14. Recess 182 accepts back pull 34. The upper area of recess 182 is trapezoid shaped, thus securing back pull 34 by preventing movement front to back, refer to FIG. 16. All rotating components, i.e., spindles, bolts, and axles may utilize a bearing.

FIGS. 14-20 illustrate the ratcheting position and non-ratcheting or free wheel position of the device 10. The free-wheel position, as shown best in FIGS. 15 and 17, allows the strap 202 to be removed, such as when strapping is complete or when removing slack to reduce ratcheting time when securing a load. In other words, the free-wheel position allows the strap to be pulled through the device without activation of the ratchet. Front plate 12 has a stop surface 252 which mates to stop surface 250 located on front pull 32. Back plate 14 has a stop surface 258 which mates to stop surface 256 located on back pull 34. Pulling release assembly 28 upwards and away from device 10 and slidably within recesses 180 and 182, refer to arrows on front pull 32 and back pull 34, moves the drive pawl 46 and stop pawl 50 from the ratchet position, i.e., out of engagement with drive gear 68 front teeth 270 and back teeth 272. Drive pawl 46 and stop pawl 50 are spring biased towards the ratcheting position (springs not shown).

Figure 18:
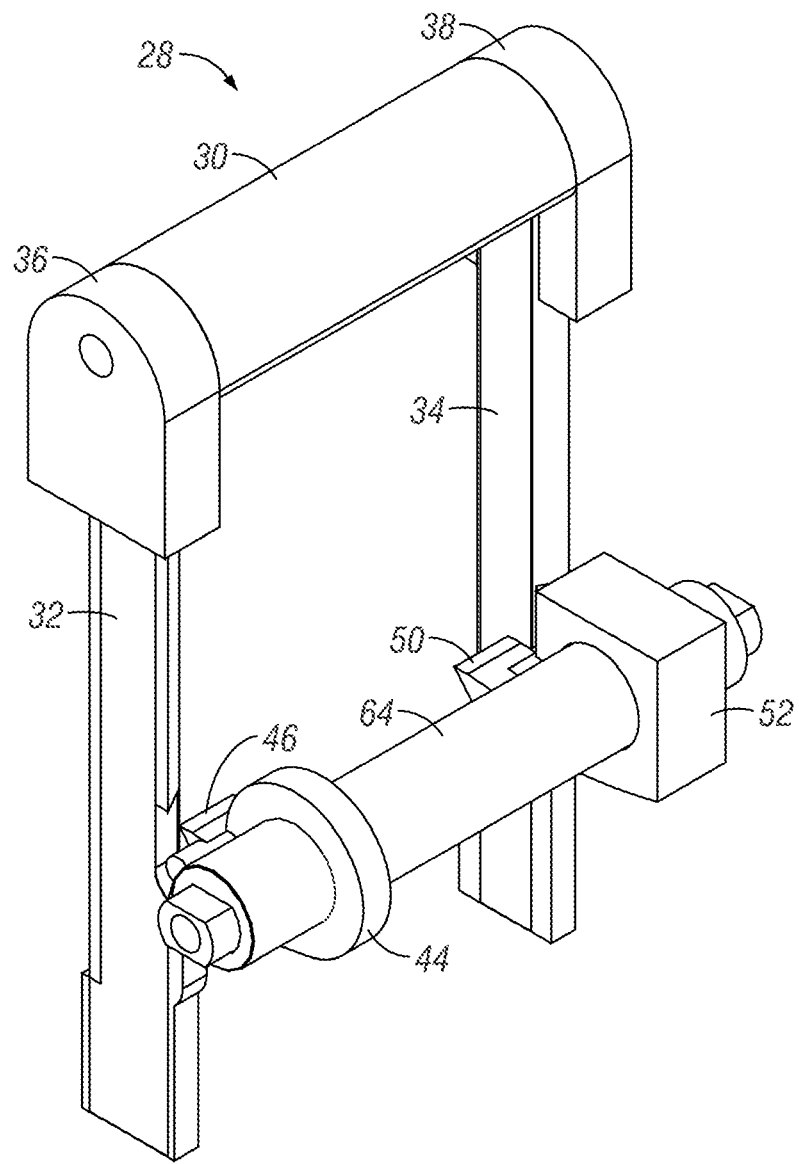
FIG. 18 is an isometric view of the ratchet assembly and release assembly of a load strapping device.
Figure 19:
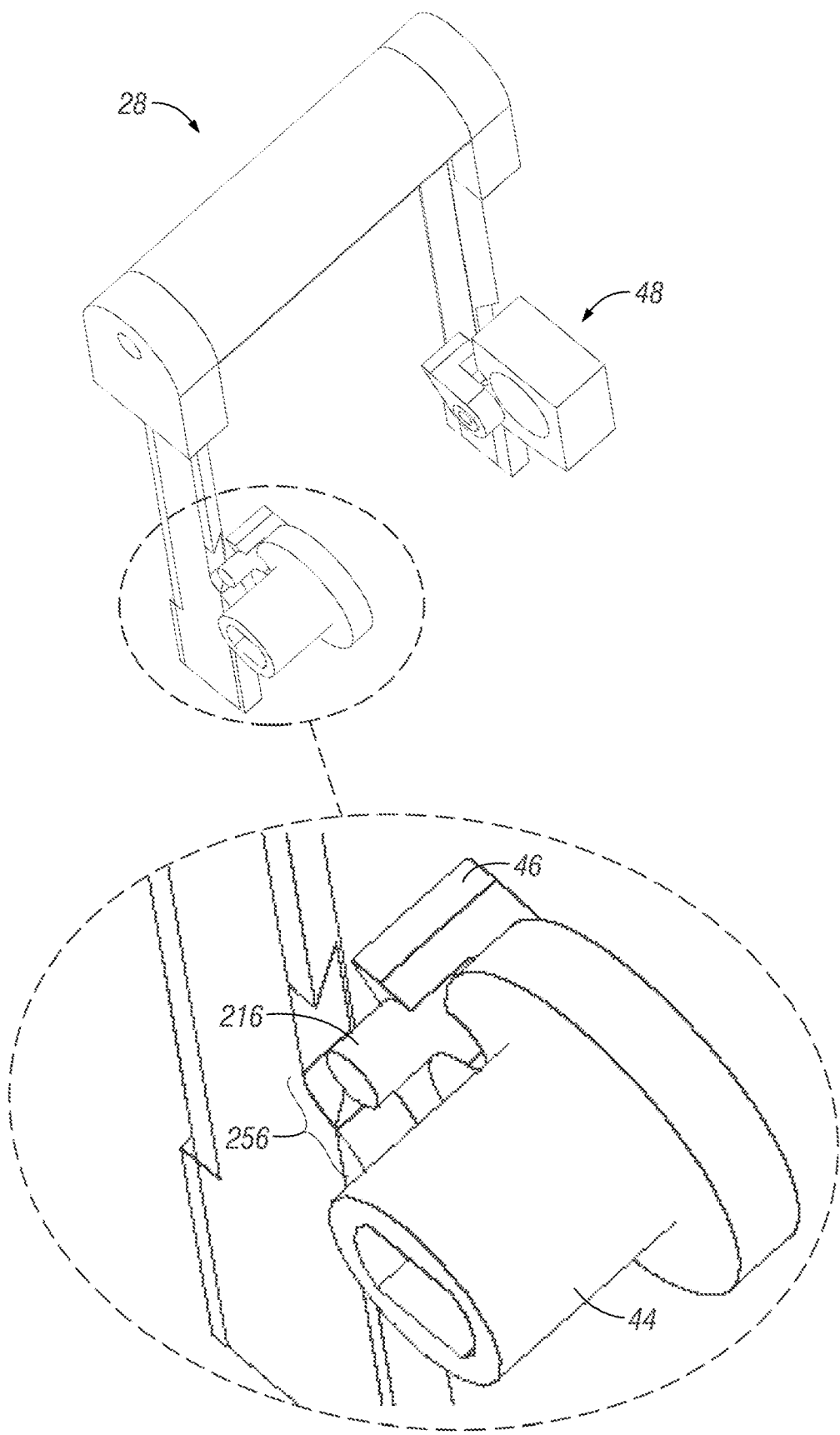
FIG. 19 is an enlarged view of the drive assembly and release assembly of the load strapping device.
Figure 20:
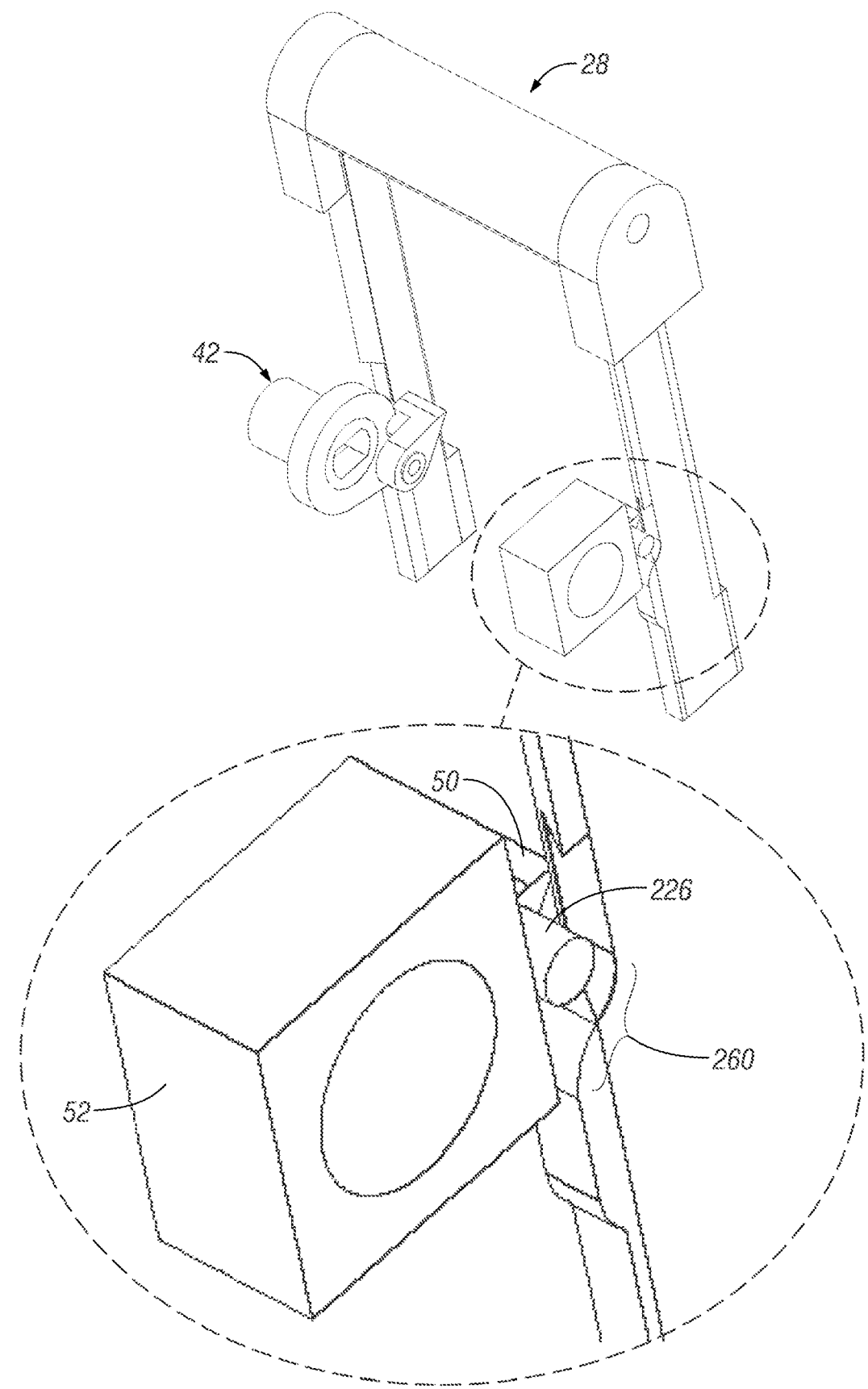
FIG. 20 is an enlarged view of the stop assembly and release assembly of the load strapping device.

Likewise, pushing release assembly 28 downwards into device 10 moves the device into the ratcheting position. FIG. 18 shows the relationship between the components of the release assembly 28, which comprises release bar 30, front pull arm 32, back-pull arm 34, front stop 36, and a back stop 38. Likewise, drive axle 64 is shown with the stop assembly 48 and drive assembly 42. The stop assembly 48 is comprised of stop pawl 50 and stop pawl pedestal 52. Stop assembly 48 maintains the latching function from failing under heavy loads or stress when the strap is engaged with a load. Stop assembly 48 does not assist with rotating drive gear 68. The square shape aids with maintaining structural integrity. Other shapes may be utilized, such as a triangle, a polygon, a circle, or other geometric shape. Preferably, that which is easy to manufacture is selected. Drive assembly 42 is comprised of a drive pawl arm 44 and a drive pawl 46. Drive assembly 42 engages with drive gear 68 teeth 270, thus pulling strap 202 through device 10. Drive pawl bolt 216 forces drive pawl 46 to rotate towards drive pawl arm 44 as the ramp 256, which is curved, sloped, or cam-shaped, integrated into the front pull 32 moves upwardly when release assembly 28 is pulled away from device 10. Likewise, stop pawl bolt 226 forces stop pawl 50 to rotate towards the stop pedestal 52 as the ramp 260 integrated into back pull 34 moves upwardly when release assembly 28 is pulled away from device 10. Thus, this simple mechanism allows drive gear 68 to disengage or engage drive assembly 42 using one hand.

Figure 21:
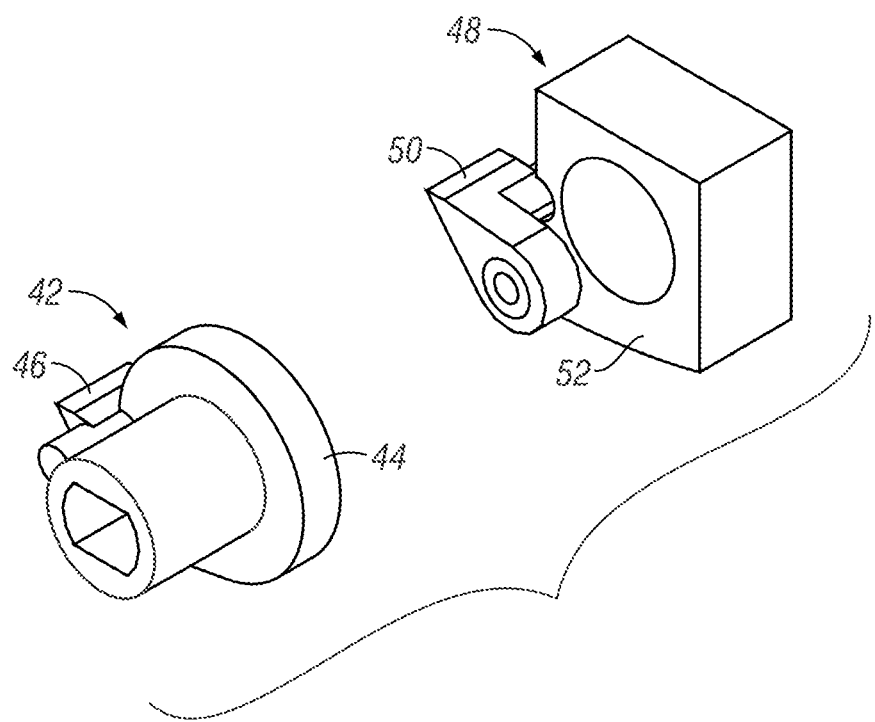
FIG. 21 is an isometric view of the ratchet assembly and release assembly of a load strapping device.

FIGS. 21-34 illustrate what is essentially a ratchet and pawl device, i.e., a mechanical device that permits motion in one direction only. The ratchet is usually a wheel with slanting teeth. The pawl is a lever tangential to the wheel with one end resting on the teeth. When the wheel rotates one way, the pawl slides over the teeth; when the wheel rotates the other way, the pawl catches in the teeth. FIGS. 21-30 illustrate drive assembly 42 and stop assembly 48. Drive assembly 42 is comprised of drive pawl arm 44 and drive pawl 46. Drive pawl arm 44 has a double "D" shaped thru hole which accepts the front end of axle 64. The double "D" shape allows axle 64 and drive pawl arm 44 to rotate as a single unit. Also shown in FIG. 21 is a stop assembly 48 comprising a stop pawl 50 and a stop pawl pedestal 52. Stop pawl pedestal 52 receives drive axle 64 through center bearing surface 218, allowing the drive axle 64 to rotate freely and securely.

Figure 22:
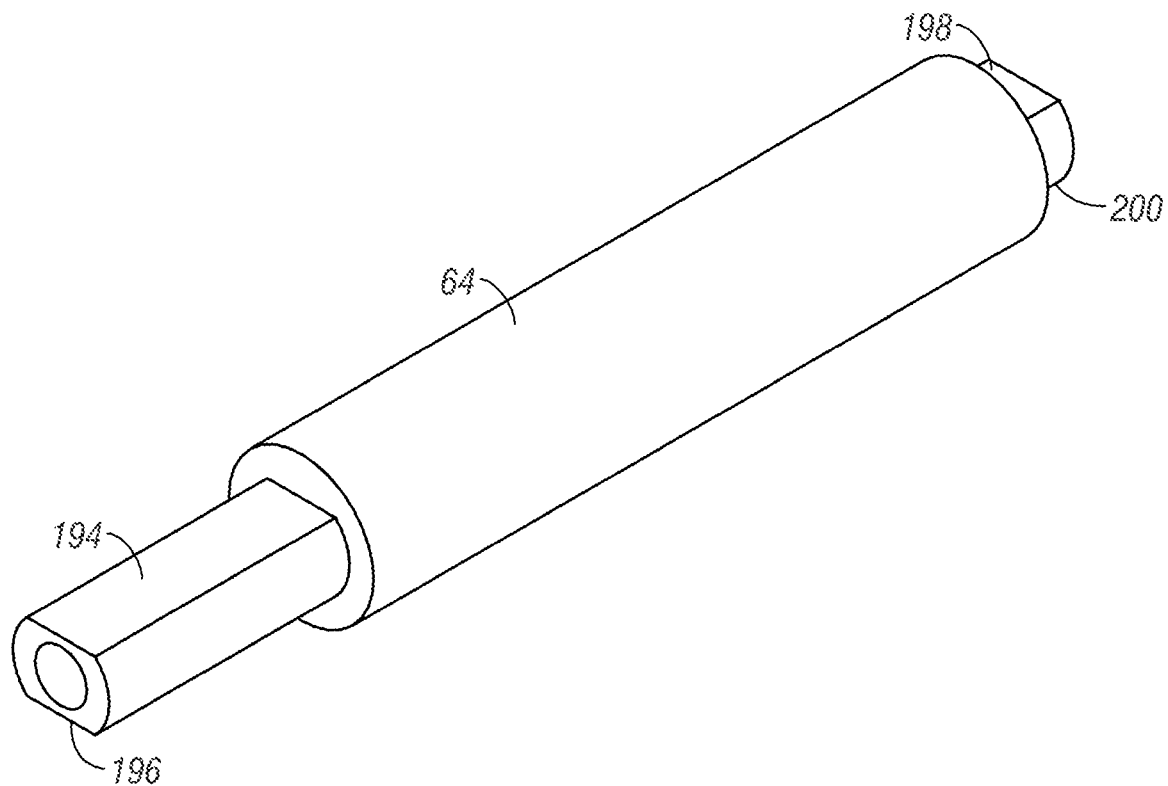
FIG. 22 is an isometric view of the drive axle of a load strapping device.
Figure 23:
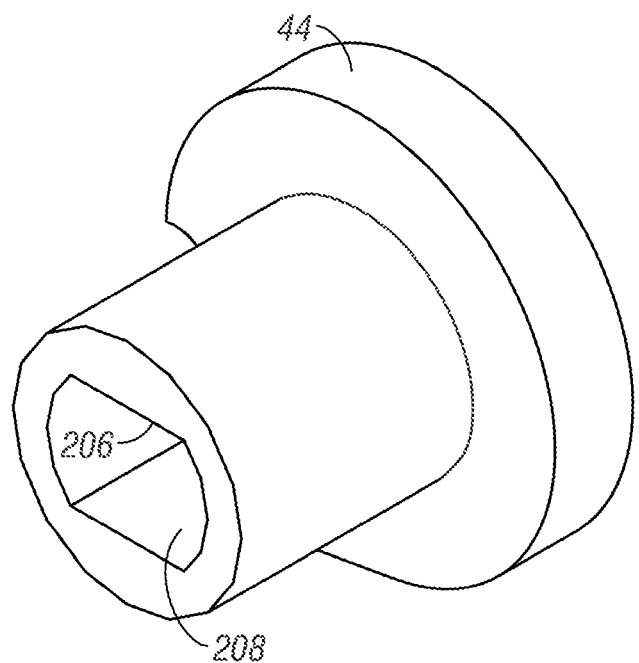
FIG. 23 is an isometric view of the drive pawl arm of a load strapping device.
Figure 24:
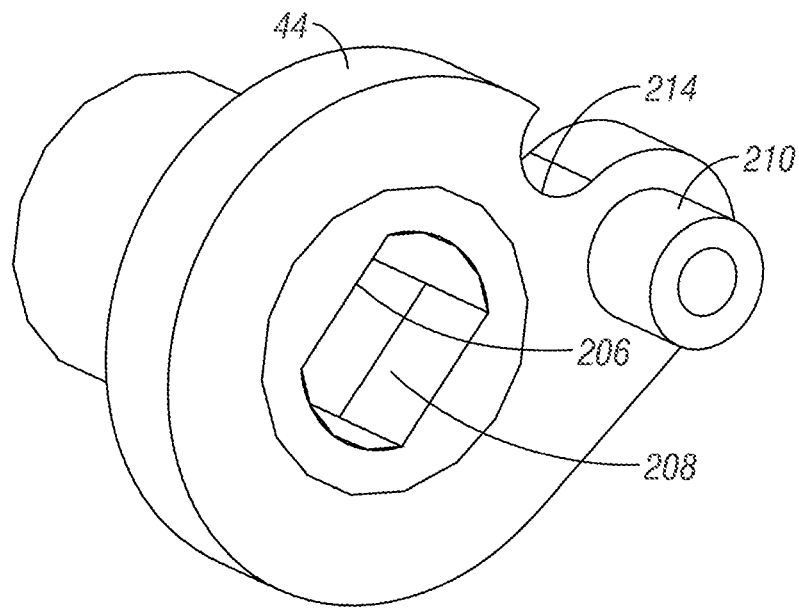
FIG. 24 is an isometric view of the drive pawl arm of a load strapping device.
Figure 25:
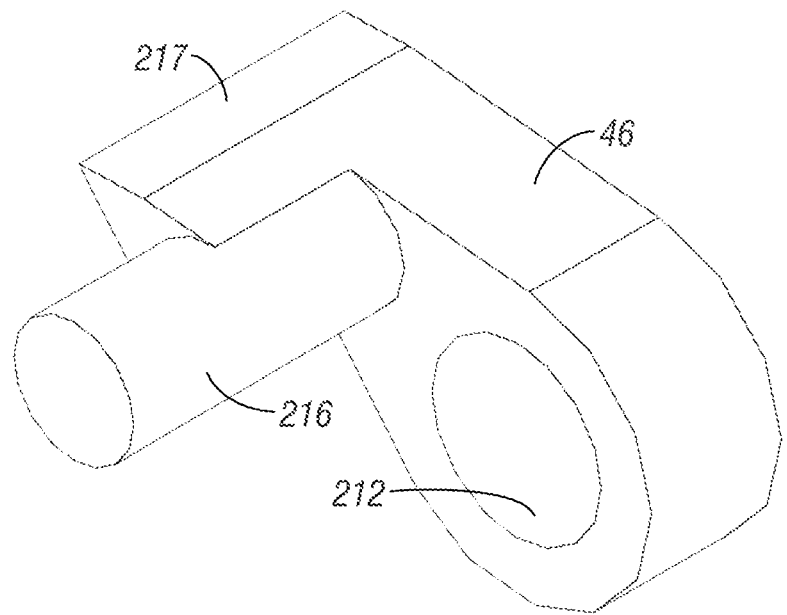
FIG. 25 is an isometric view of the drive pawl of a load strapping device.
Figure 26:
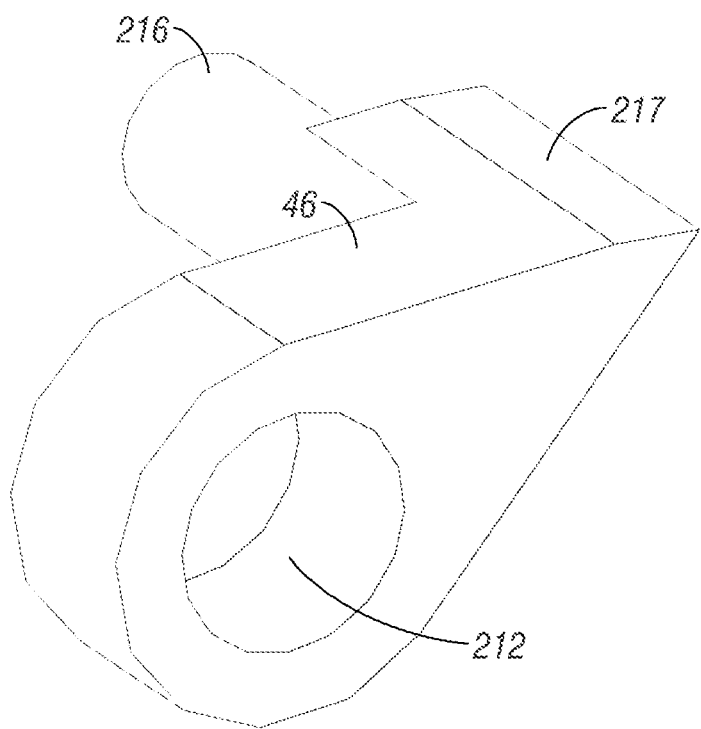
FIG. 26 is an isometric view of the drive pawl of a load strapping device.
Figure 27:
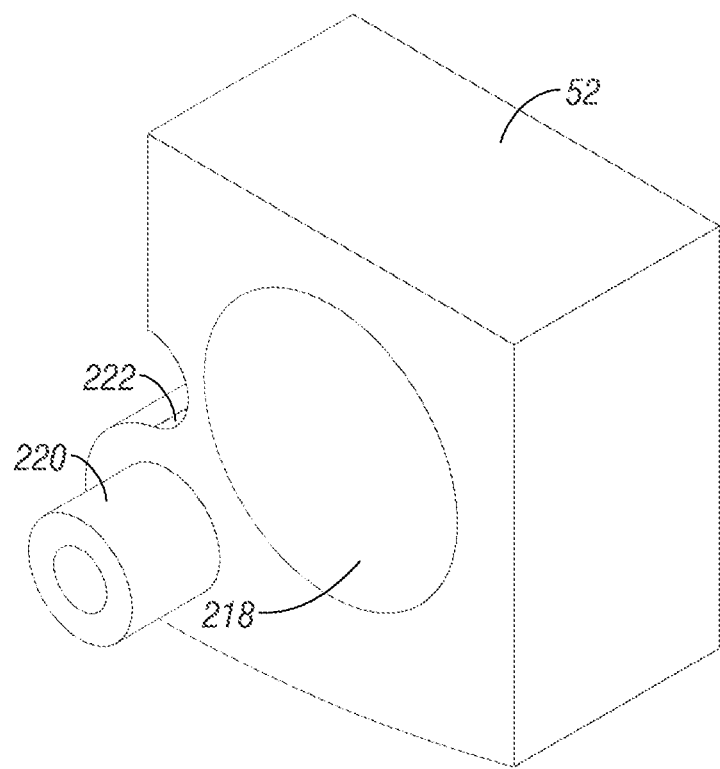
FIG. 27 is an isometric view of the stop pawl pedestal of a load strapping device.
Figure 28:
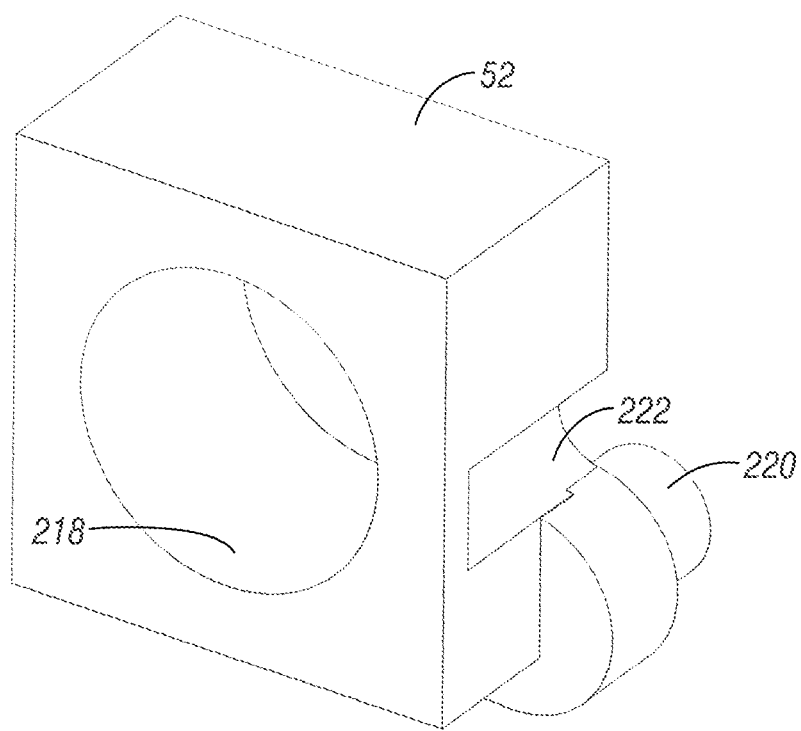
FIG. 28 is an isometric view of the drive pawl pedestal of a load strapping device.
Figure 29:
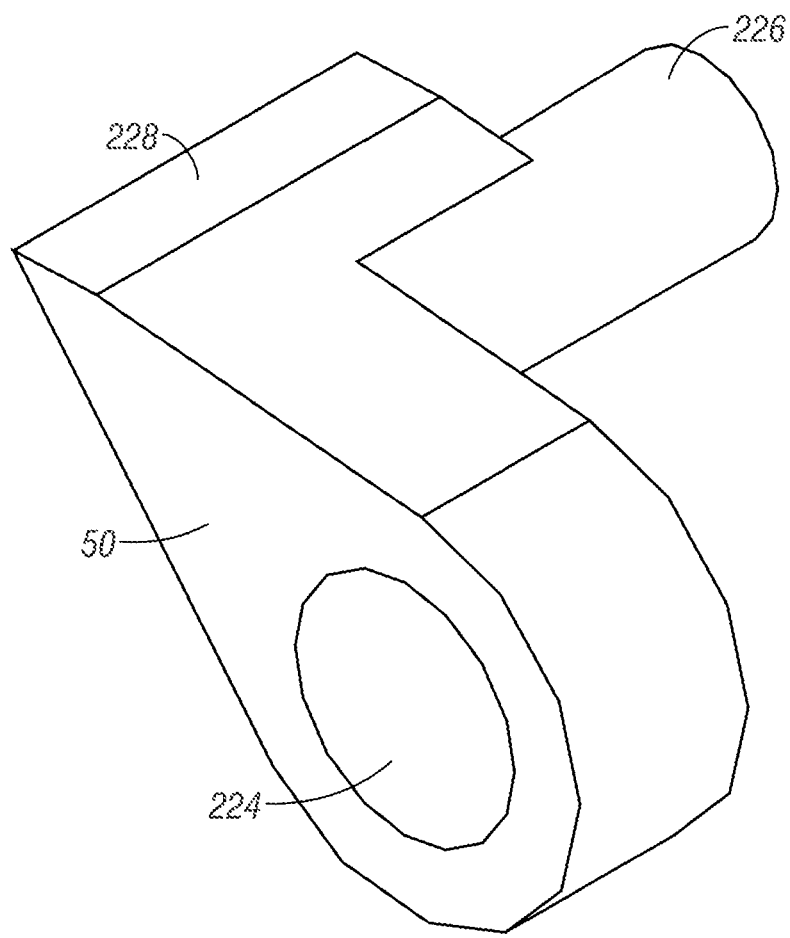
FIG. 29 is an isometric view of the stop pawl of a load strapping device.
Figure 30:
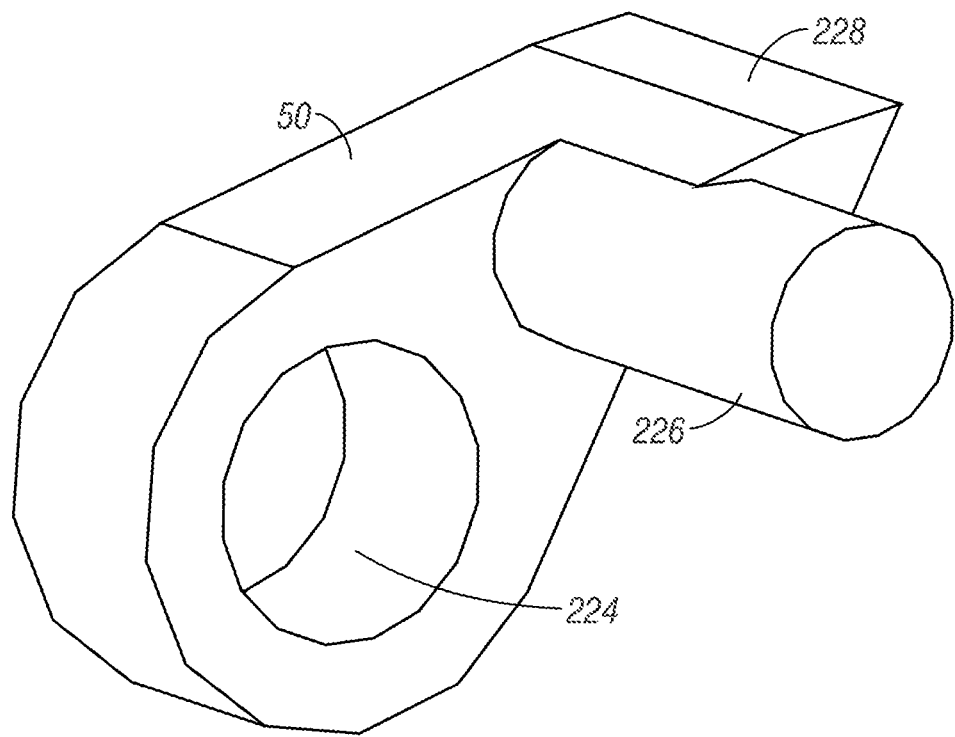
FIG. 30 is an isometric view of the stop pawl of a load strapping device.
Figure 31:
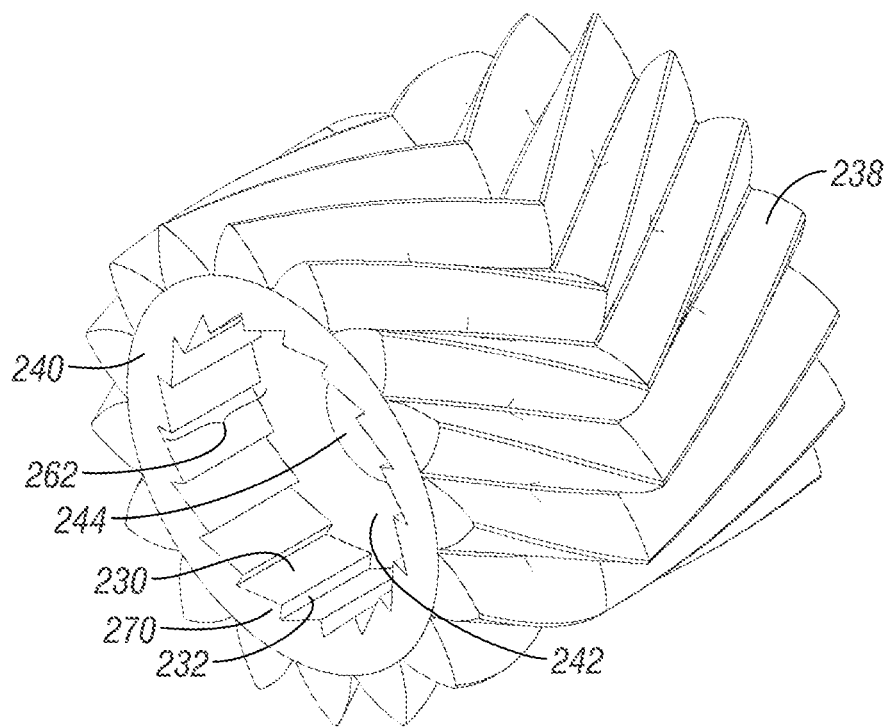
FIG. 31 is an isometric view of the drive gear of a load strapping device.
Figure 32:
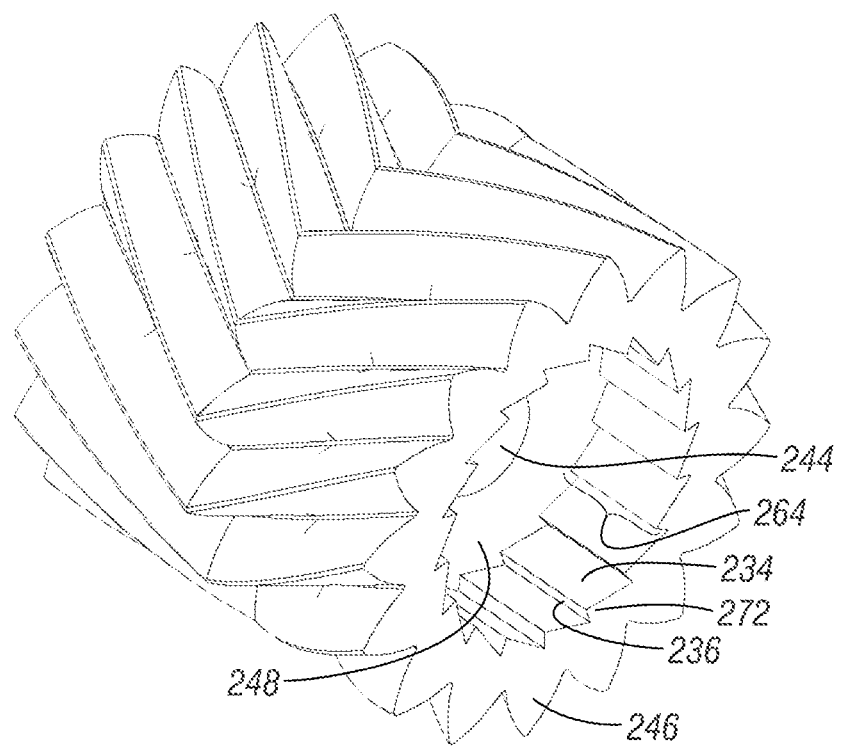
FIG. 32 is another isometric view of the drive gear of a load strapping device.

Referring to FIG. 22, the drive axle 64 front end is comprised of top surface 194 and bottom surface 196. The Double "D" surface receives drive pawl arm 44 and front arm 24. At the back end of drive axle 64 is another double "D" surface wherein the top surface 198 and bottom surface 200 serve to mate with the back arm 26.

Drive pawl arm 44 is a cam wherein bolt 210 is offset from central its axis. This offset magnifies the torque applied to drive pawl 42 when drive axle 64 rotates clockwise. Drive pawl arm 44 top surface 206 and bottom surface 208 receive drive axle 64 top surface 194 and bottom surface 196 respectively, see, e.g., FIG. 23. Drive pawl 44 bolt 210 receives drive pawl 46 via bearing surface 212. Drive pawl assembly 42 also utilizes a spring to maintain drive pawl 46 in the rotational drive position. Drive pawl 42 and drive pawl arm 44 maintain their relationship via attachment methods such as a rivet, a roll pin, a barrel bolt, a sleeve nut, a cotter pin, or the bias spring (all of which are not shown). Drive pawl 42 rotates about the center axis of bolt bearing 212. When drive pawl 42 rotates upwards due to the upward motion of front pull 32, it will stop rotating when bolt stop 216 is received into recess 214 of drive pawl arm 44. Drive pawl 46 is tear shaped, being wide at the rotating or pivoting end and narrow at the engaging end. At the narrow end is a surface 217 which engages drive gear 68 teeth.

Stop pawl pedestal 52 has a bolt 220 which is offset to allow stop pawl 50 to engage drive gear 68. Stop pedestal 52 has a bolt 220 which receives stop pawl 50 via bearing surface 224. Stop pawl pedestal assembly 48 also utilizes a spring to maintain stop pawl 50 in the rotational stop position. Stop pawl 50 and stop pawl pedestal 52 maintain their relationship via attachment methods such as a rivet, a roll pin, a barrel bolt, a sleeve nut, a cotter pin, or the bias spring (all of which are not shown). Stop pawl 50 rotates about the center axis of bolt bearing 220. When stop pawl 50 rotates upwards due to the upward motion of back pull 34, it will stop rotating when bolt stop 226 is received into recess 222 of stop pawl pedestal 52. Stop pawl 50 is tear shaped, being wide at the rotating or pivoting end and narrow at the engaging end. At the narrow end is a surface 228 which engages drive gear 68 teeth.

Referring to FIGS. 31-34, a drive gear 68 is an internally toothed ratchet wheel that converts an oscillating motion to an intermittent circular motion. The drive gear has an outer surface 238, which grabs and pulls strap 202 through device 10 is shown as a herringbone pattern. Surface 238 may be any known surface which may pull and tension the strap 202. Drive gear 68 has a through hole bearing surface 244 for axle 64. Drive gear 68 front side has a front outer face 240 and front inner face 242. The distance between 240 and 242 creates front tooth ring 262 which drive pawl 44 engages. This internal cavity protects drive assembly 42 and teeth 270. Each drive tooth is comprised of a glide surface 230 and a tooth drive surface 232. Glide surface 230 allows drive pawl 46 to slide past until it can engage drive surface 232. Drive gear 68 on the backside likewise has an outer face 246 and an inner face 248. The area between outer face 246 and inner face 248 creates back tooth ring 264 which stop pawl 520 engages. This internal cavity protects drive assembly 42 and teeth 270. Each drive tooth has a stop surface 236 and a glide surface 234. Glide surface 234 allows stop pawl 50 to slide past until it can engage stop surface 236. The radial edge of each tooth 270 and 272 is shaped so that back pressure from drive gear 68 forces the pawls upon surfaces 232 and 236 respectively. This is done by ensuring that the angle between the line from the pawl pivot to the contact point and the line of the radial portion of the tooth is less than 90 deg.

Figure 33:
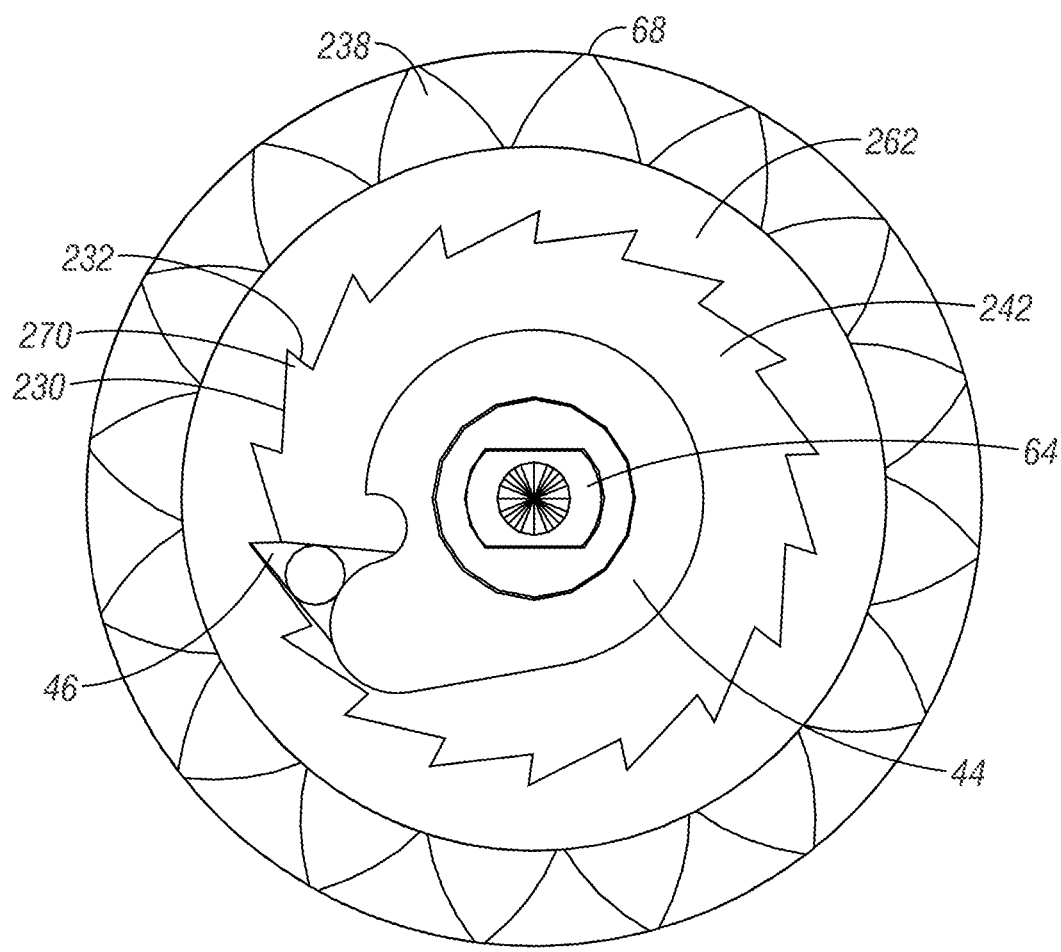
FIG. 33 is a front view of the drive gear and drive assembly of a load strapping device.
Figure 34:
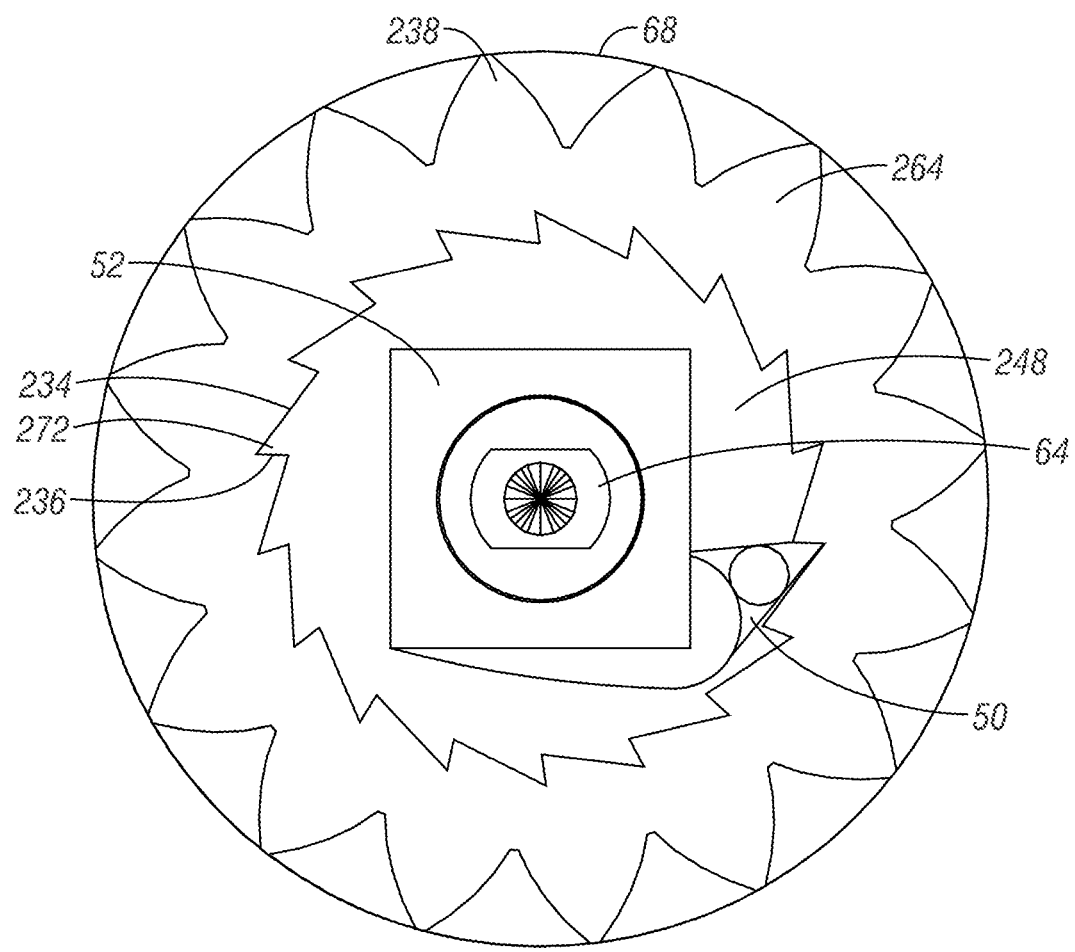
FIG. 34 is a rear view of the drive gear and stop assembly of a load strapping device.

Referring now to FIGS. 33 and 34, the handle assembly 20 is an oscillating lever that moves drive pawl 46. Stop pawl 50 prevents backward motion of the wheel. When the axle 64 moves clockwise, drive pawl 46 tooth edge 217 engages front tooth 270 and will move drive gear 68 part of a revolution. Stop pawl 50 allows such motion. When axle 64 moves counterclockwise, drive pawl 46 slides over teeth 270 and drive gear 68 remains motionless due to stop pawl 50. The pawls are often held in contact with drive gear teeth 270 and 272 via springs or other known methods (springs not shown). Furthermore, the handle assembly may allow a drill to rotate drive gear 68 or be replaced by an internal or externally mounted electric motor. Common battery sizes may be inserted where second idler gear, third idler gear or fourth idler gear are presently located or a specific battery housing which attaches to device 10.

Figure 35:
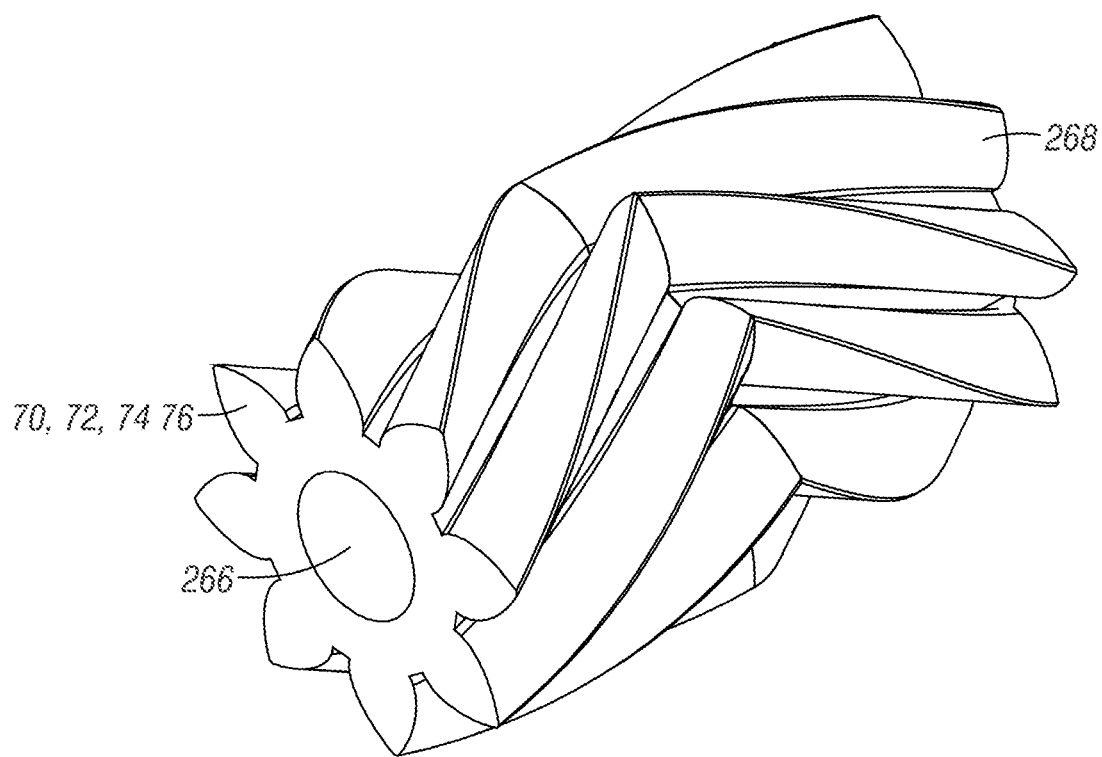
FIG. 35 is an isometric view of the idler gear of a load strapping device.

FIG. 35 illustrates idler gears 70-76. The outer surface 268, which meshes with drive gear 68 surface 238 to grab and gear strap 202 through device 10, is shown as a herringbone pattern. Surface 268 may be any known surface which may pull and gear strap 202. Idler gears 70-76 have a through hole bearing surface 266 to receive a spindle (spindle not shown). Idler gears 70-76 may be a single device wherein the spindle is integrated within each gear.

A second embodiment (not shown) utilizes a housing which is large enough to store gear strap 202 within device 10. Gear strap 202 would be operantly affixed to drive gear 68. Thus, gear strap 202 would be retracted within device 10 after use, removing the need to store separately from device 10. The method for retraction may be manually via the handle, a biased spring, an electric handheld drill, or an internal electric motor.

Figure 36:
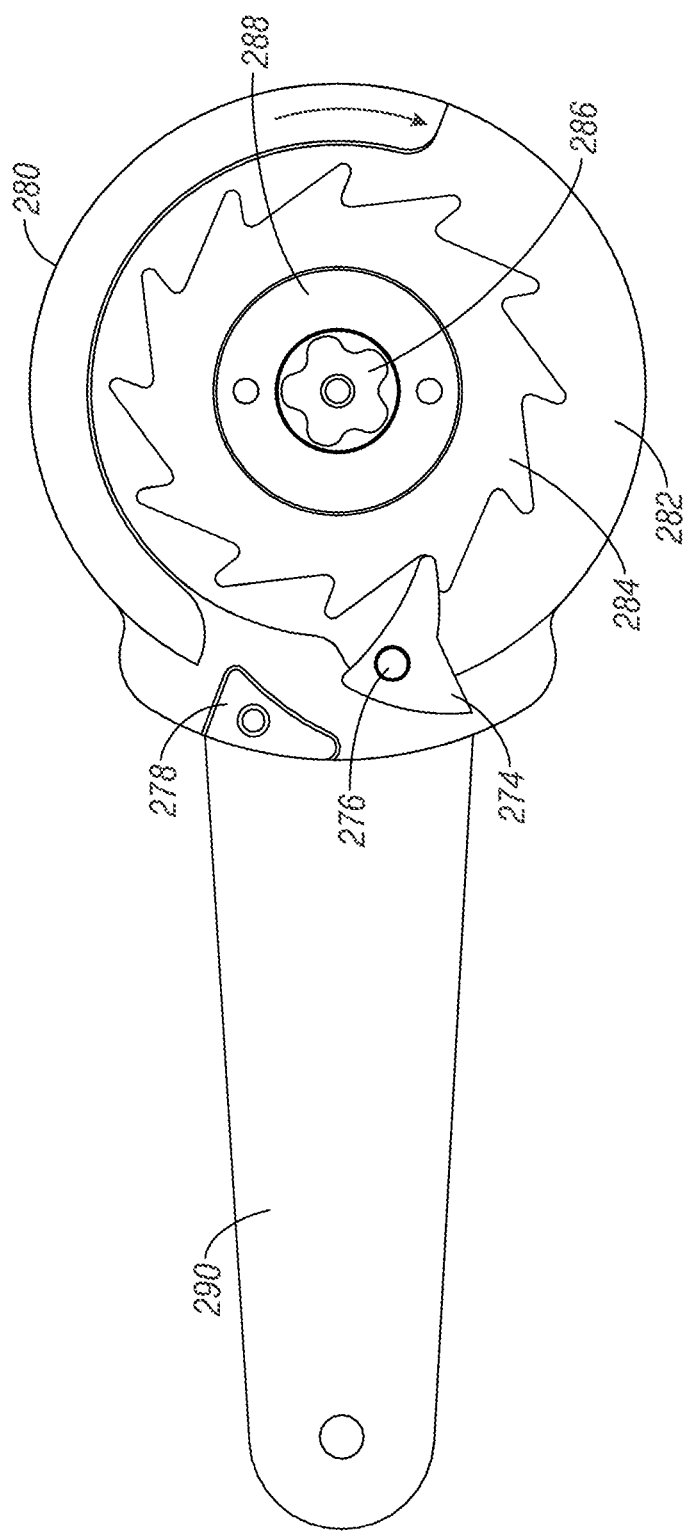
FIG. 36 is a front view of another embodiment of a load strapping device.
Figure 37:
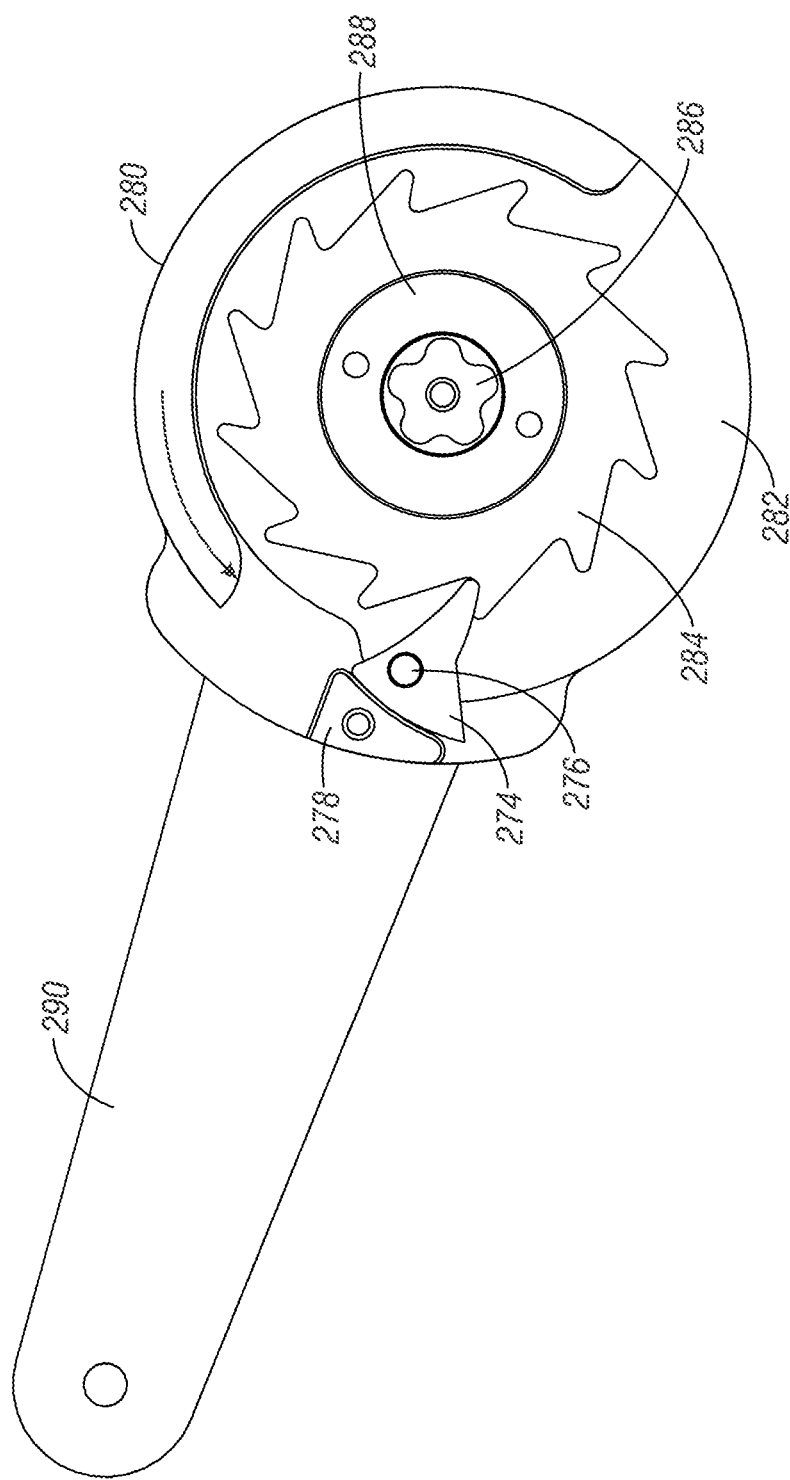
FIG. 37 is a back view of the load strapping device of FIG. 36.

Another embodiment adds a claw to the ratchet and pawl mechanism. FIGS. 36-37 illustrate a claw drive as utilized within aspects of the present invention. Referring to FIG. 36, the mechanism utilizes a drive arm connector 278, which interfaces or contacts claw 274. When the back arm 290 is rotated clockwise, drive arm 280 and drive gear 284 will also rotate because drive axle 286 is moving clockwise. Drive arm 280 will engage the claw arm 282. Drive gear 284 and claw arm 282 thus rotate claw 274 into drive arm connector 278, thus pinching and grasping a strap (not shown). When back arm 290 is rotated counterclockwise, drive arm 280 and drive gear 284 will also rotate because drive axle 286 is moving counterclockwise. Drive arm 280 will engage claw arm 282. Drive gear 284 and claw arm 282 thus rotate claw 274 away from drive arm connector 278, thus releasing a strap (not shown).

Figure 38:
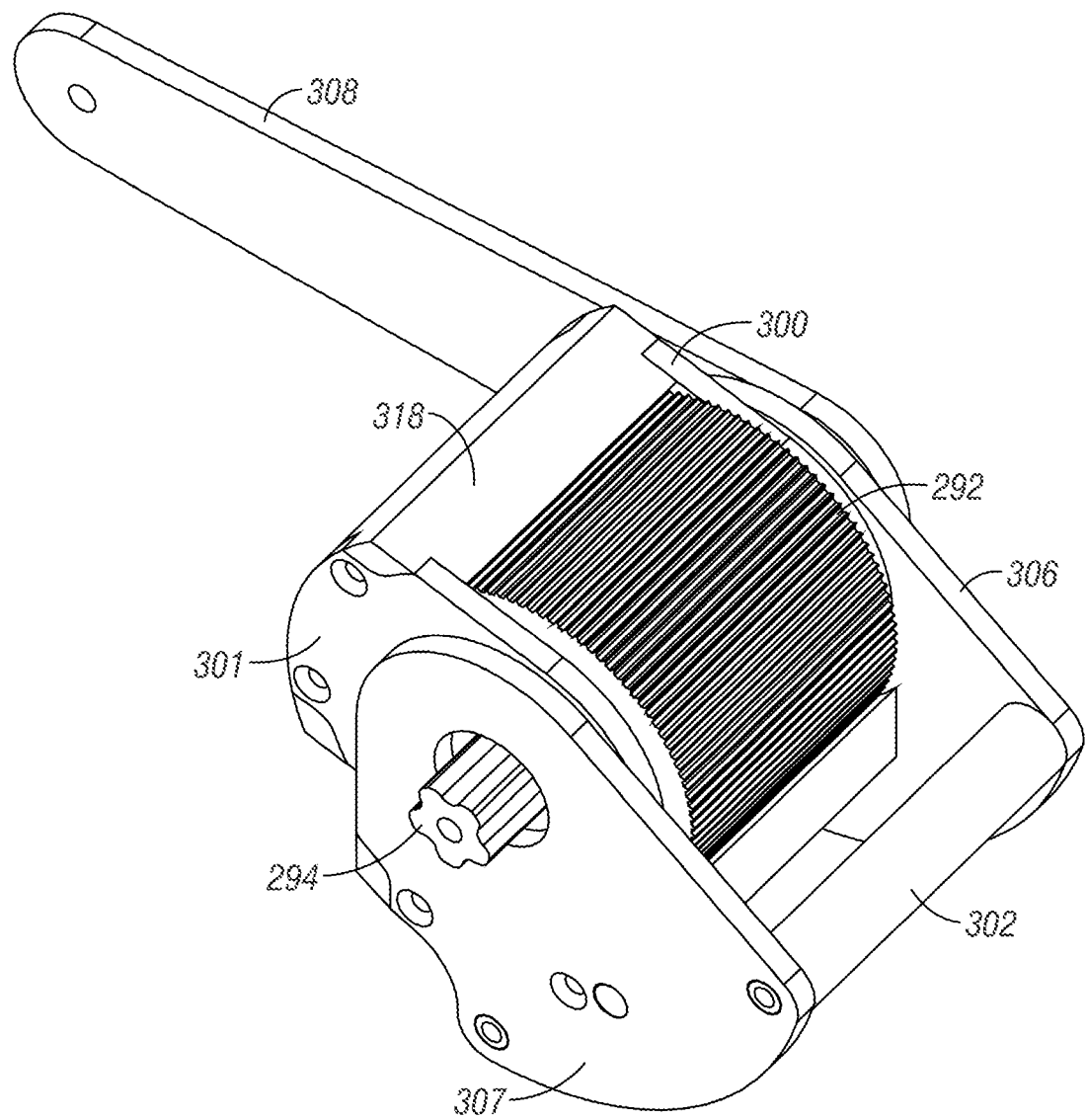
FIG. 38 is an isometric view of another embodiment of a load strapping device.
Figure 39:
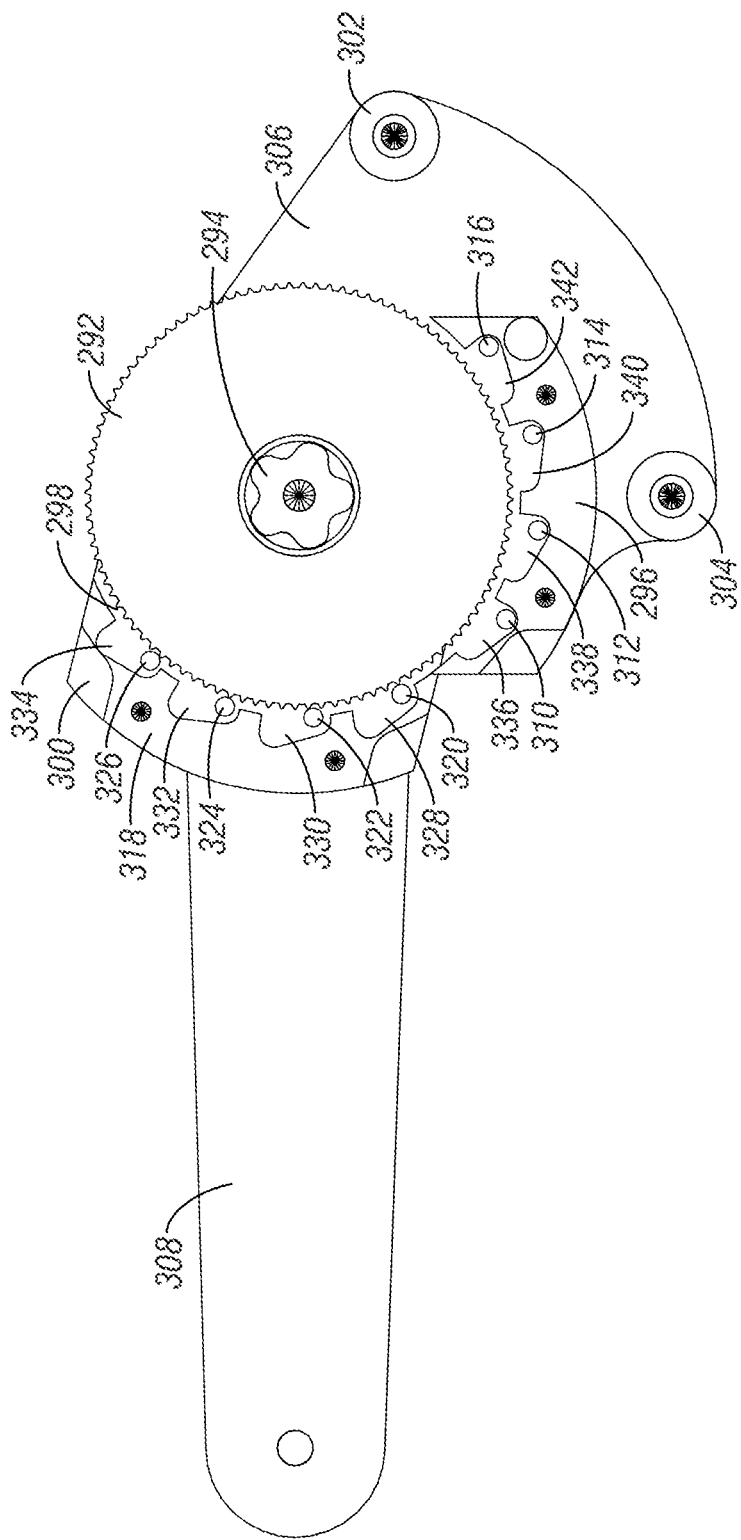
FIG. 39 is a front view of the load strapping device of FIG. 38.
Figure 40:
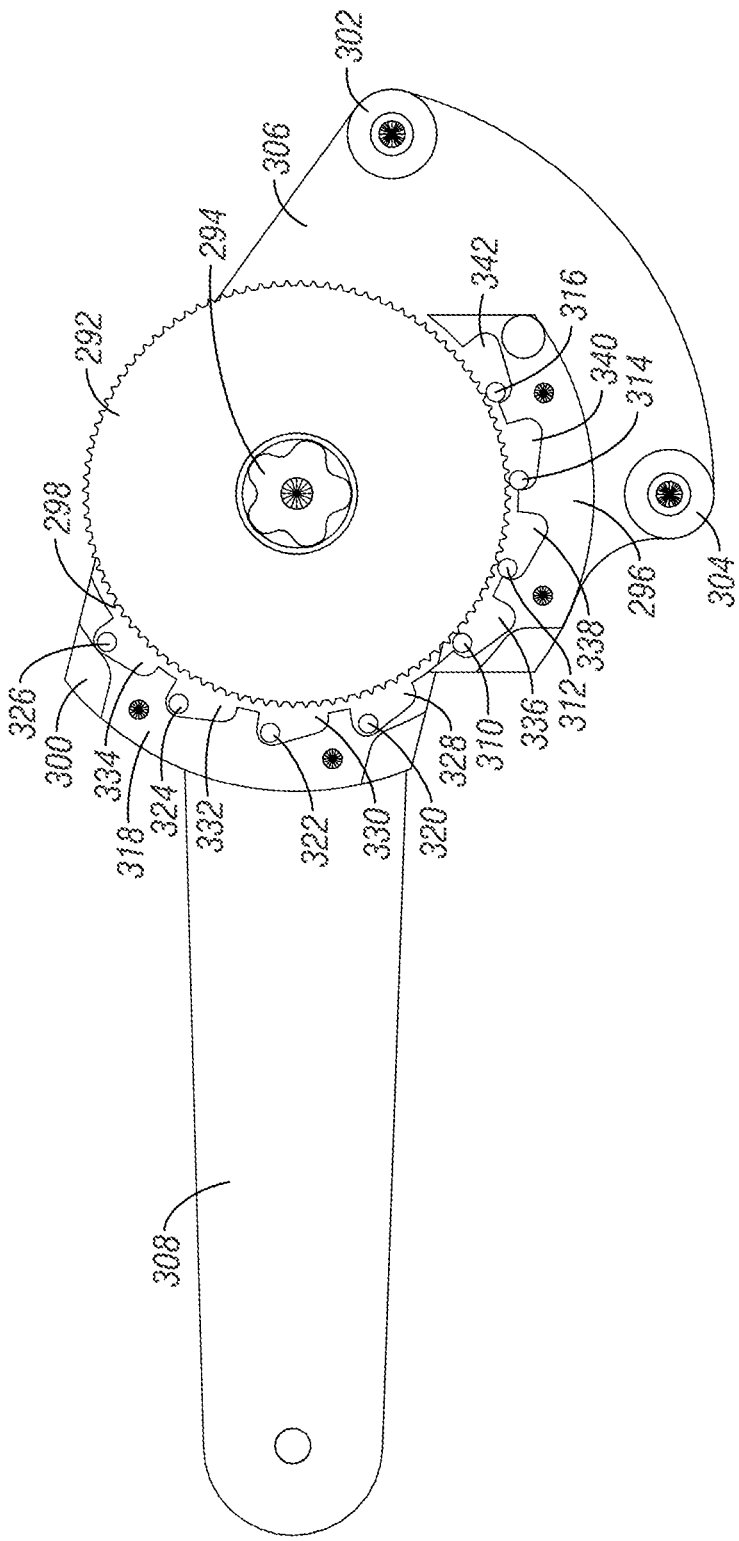
FIG. 40 is a front section view the load strapping device of FIG. 38.
Figure 41:
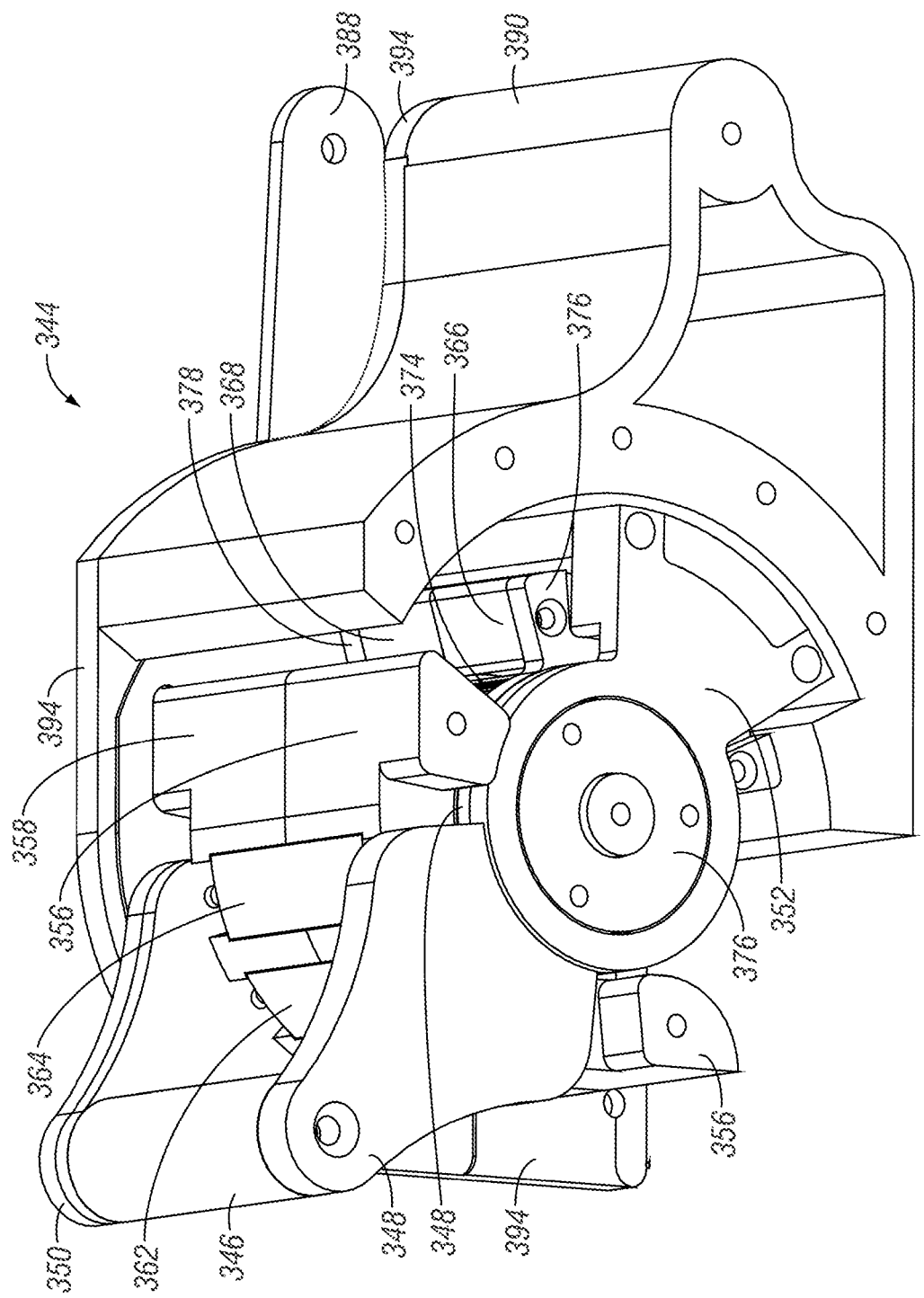
FIG. 41 is an isometric view of another embodiment of a load strapping device.
Figure 42:
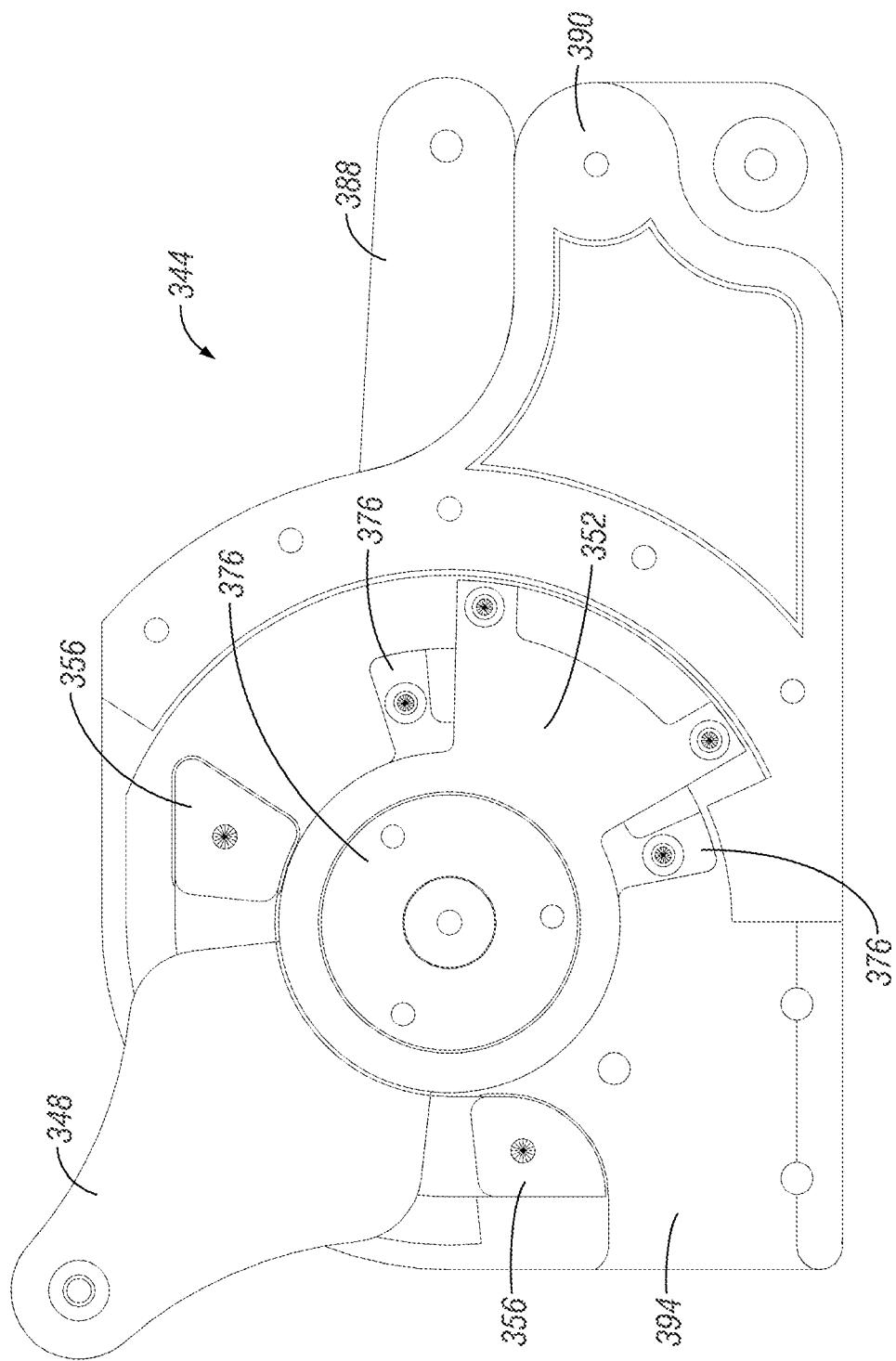
FIG. 42 is a front view of the load strapping device of FIG. 41.
Figure 43:
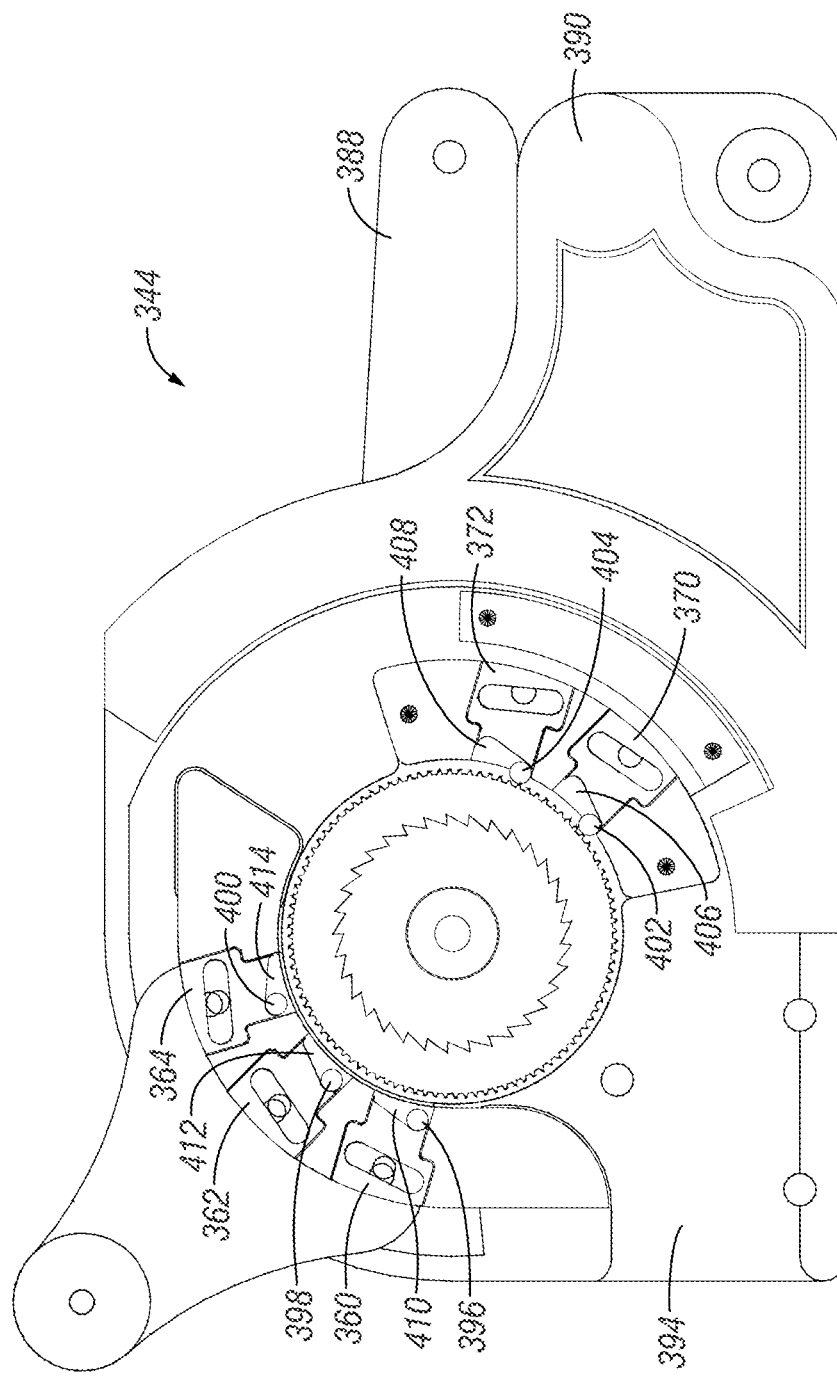
FIG. 43 is a front section view of the load strapping device of FIG. 41 in a stop position.
Figure 44:
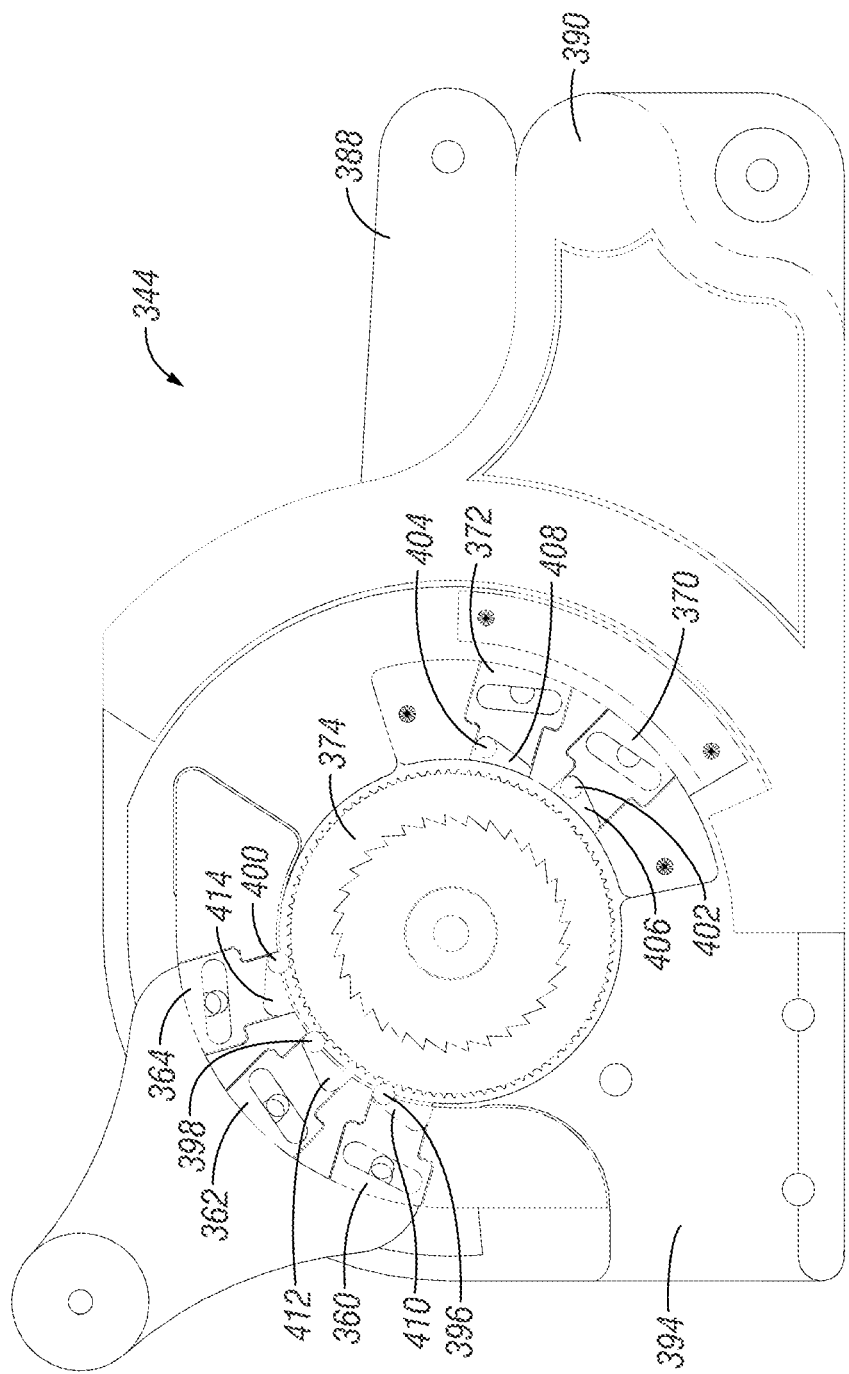
FIG. 44 is a front section view the load strapping device of FIG. 41 in a drive position.

Yet another embodiment replaces the ratchet and pawl mechanism with a roller clutch, such as shown in FIGS. 38-40. Conventional roller ramp clutches traditionally have four main components: The concentric and round raceway of the outer ring; The star-like shaped configuration of the clamping ramps at the inner ring; The clamping rollers; and Separate spring loading for each roller, based at the inner ring. A roller clutch comprises a cylindrical outer race, an inner race with ramps and individually sprung rollers. The springs ensure that the rollers are held in contact with the outer race and inner race ramp, making torque transmission instantaneous. Drawn cup roller clutches transmit torque between the shaft and the housing in one direction and allow free overrun in the opposite direction. When transmitting torque, the shaft or the housing can be the input member. The individual spring retention of the needle rollers ensures constant contact between the shaft, the needle rollers and the ramps.

The conventional outer raceway is not needed as drive wheel 292 is substituted for a traditional raceway and is rotated by the clamping method provided by the ramps and rollers. A drive sprag 318 comprises a first clamping ramp 328, a second clamping ramp 330, a third clamping ramp 332, and a fourth clamping ramp 334. Each clamping ramp houses a spring-loaded (spring not shown) roller bearing 320-326 respectively. The spring may not be needed in all embodiments, however. The springs ensure that the rollers maintain contact with drive wheel 292. Likewise, stop sprag 296 comprises a first clamping ramp 310, a second clamping ramp 312, a third clamping ramp 314, and a fourth clamping ramp 316. Each clamping ramp houses a spring-loaded (spring not shown) roller bearing 320-326 respectively. The springs ensure that the rollers maintain contact with drive wheel 292. Two drive arms, a front 301 and a mirrored back arm 300 are rotated by drive axle 294. Drive arms 300 and 301 have a star shape opening which mates to a star shaped drive axle 292 to ensure rotation via handle 308. The axle shape may be a double "D", a triangle, a square, or any shape which ensures rotation. Each drive arm 300 and 301 mates to drive sprag 318, see, e.g., FIG. 38. When handle 308 is rotated clockwise, see, e.g., FIG. 39, drive roller bearings 320-326 drive wheel 292 clockwise and pull strap 202 (not shown) through the device. Drive wheel 292 surface structure may be any form and material which will maintain positive contact with strap 202. Also, roller bearings 310-316 within stop sprag 296 will not resist clockwise rotation of drive wheel 292 as they forced into the larger cavity area of ramps 336-342 respectively. The clockwise rotation is stopped when drive arms 300 and 301 contact first roller stop 302. Roller stop 302 will rotate stop arms 306 and 307 which rotates stop sprag 296. Stop sprag 296 will stop drive wheel clockwise rotation and hold strap 202. When handle 308 is rotated counterclockwise, refer to FIG. 40, stop sprag 296 will continue to hold strap 202 as roller bearings 310-316 remain engaged with drive wheel 292. Drive sprag 318 rollers 320-326 roll over drive wheel 292 when rotating counterclockwise as they are forced into the larger cavity area of ramps 328-334 respectively.

Still another embodiment replaces roller bearings 310-316 and 320-326 with sprags. A sprag clutch is a one-way freewheel clutch. It resembles a roller bearing but, instead of cylindrical rollers, non-revolving asymmetric figure-eight shaped sprags are used. When the unit rotates in one direction the rollers slip or free wheel, but when a torque is applied in the opposite direction, the rollers tilt slightly, producing a wedging action and binding because of friction. The sprags are spring-loaded so that they lock with very little backlash.

Yet still another embodiment utilizes a roller clutch with a release handle, which is shown in FIGS. 41-44. In addition to the release arm, there are arms that with cams and slots that engage and disengage the roller strap ramps—370, 372 for the drive mechanism and 360, 362, 364 on the backstop mechanism. The movement of the main lever has a mechanism that engages the cams on the pull stroke and disengages the cams on the release stroke. A drive sprag front housing 366 and a drive sprag back housing 368 enclose a first drive cam 370 and a second drive cam 372. First drive cam 370 comprises a first clamping ramp 406 and a first roller bearing 402. Second drive cam 372 comprises a second clamping ramp 408 and a second roller bearing 404. Each roller bearing is spring loaded (spring not shown). The springs ensure that the rollers maintain contact with drive wheel 374. Likewise, a stop sprag front housing 256 and stop sprag back housing 358 encloses a first release cam 360, a second release cam 362, and a third release cam 364. First release cam 360 comprises a first clamping ramp 4410 and a first roller bearing 396. Second release cam 362 comprises a second clamping ramp 412 and a second roller bearing 398. Third release cam 364 comprises a third clamping ramp 414 and a third roller bearing 400. Each roller bearing is spring loaded (spring not shown). The springs ensure that the rollers maintain contact with drive wheel 374. Rotating release handle 346 clockwise which is connected to front arm 348 and back arm 350 will position release cams 360-364 towards drive wheel 374 and drive cams 402-404 away drive wheel 374, refer to FIG. 44. This is the stop position, i.e., a strap (not shown) cannot be pulled through device 344, nor can a strap be pulled out of the device. Rotating release handle 346 counterclockwise which is connected to front arm 348 and back arm 350 will position release cams 360-364 away from drive wheel 374 and drive cams 402-404 towards drive wheel 374, refer to FIG. 43. This is the drive position. A strap may be pulled out of device 244 or fed into device 244 when release handle is in the middle or default position. The slots within release and drive cams are spindles. Each spindle forces the cam towards or away from drive wheel 374 when release handle 146 is rotated clockwise or counterclockwise. Back drive release arm 378 contains a planetary gear system (not shown) which translates rotational movement by back stop release arm 350 to actuate drive sprag cams 370 and 372. A center guide 390 is mated to front and back plates (not shown) to form an enclosure for the roller clutch assembly and guide a strap through said assembly.

Therefore, embodiments of a tie down strap assembly have been shown and described. The embodiments provide numerous advantages over what is currently known and used in the art. The self-feeding aspects of the drive mechanisms mitigates issues related to the winding, unwinding, and feeding of a strap into a device prior to use. The self-feeding mechanisms also provide for near infinite use of the length of the strap. There is no doubling back of the strap on itself, which becomes sized to disallow further movement, such as is the case with present ratchet strap assemblies.

Is use, a strap may include hooks or other attachment members at each end. The hooks can be attached at opposite ends of an area to be secured (tied down), and the ratchet assembly can be activated. There only needs to be enough slack to connect at each point, and then the device can be operated without fear of the strap being too long and having to start over. This is accomplished by the infinite or near-infinite feed of the strap though the system to allow for lengths of any amount to be tied down by the assembly.

Still other advantages exist. These includes, but are not limited to, the ability to ratchet the full length of the strap; guides keep the strap from folding on itself; a release that is single action, one hand required, and no doubled over bound strap to unwind; ratcheting mechanism is enclosed and weather proof; a gear strap that does not require unwinding or threading of strap before using the ratchet; and geared ratcheting action can possibly give more leverage than standard ratchet.

It is to be appreciated that the embodiments of the present invention provide numerous advantages over the art. For example, the invention includes numerous methods, means, and systems for providing safe, easy, efficient, one-hand operation, weatherproof design, or a combination thereof. The present invention will allow a user to ratchet the full length of the strap, keep the strap from folding on itself, eliminate the need unbound the strap especially when fully wound, eliminate the need for unwinding or threading strap before using the ratchet, and the device is enclosed and weatherproof.

Therefore, the system, method, and means of strapping a load have been disclosed. The invention contemplates numerous variations, options, and alternatives, and it is not to be limited to the specific embodiments described herein. Those skilled in the art will appreciate that, while the invention has been heretofore disclosed, various other changes may also be included within the scope of the invention.

The invention claimed is:

1. A load strapping device comprising:
   an enclosed housing having a strap entry and a strap exit, wherein a load strap is guided through the device entrance to said exit;
   a drive mechanism within the housing that is rotatable and including a ratchet assembly to control the movement of the drive mechanism; and
   at least one idler gear in communication with the drive mechanism to aid in urging the strap through the housing;
   wherein the drive mechanism comprises a drive wheel driven by a handle and spaced from the at least one idler gear to allow the load strap to pass between the drive wheel and the at least one idler gear; and wherein the at least one idler gear comprises four idler gears surrounding the drive wheel.

2. The device of claim 1, further comprising:
an attachment point opposite strap entry and exit end for attaching a fixed length strap;
at least one ratchet mechanism which allows motion in one direction only; and
a ratchet engagement/disengagement handle.

3. The device of claim 1, wherein the drive wheel comprises a drive gear with an outer surface.

4. The device of claim 3, wherein the outer surface of the drive gear, and the idler gear comprises a herringbone pattern.

5. The device of claim 3, wherein the outer surface of the drive gear comprises a mirrored herringbone pattern.

6. The device of claim 3, wherein the outer surface of the drive gear, and the idler gear is knurled.

7. The device of claim 3, wherein the outer surface of the drive gear is straight.

8. The device of claim 3, wherein the outer surface of the drive gear comprises a helical pattern.

9. The device of claim 8, wherein the idler gear comprises a helical pattern.

10. A load strapping device, comprising:
an enclosed housing having a strap entry and a strap exit on a common end, wherein a load strap is guided through the device entrance, through the housing, and to said exit;
an attachment point opposite the strap entry and exit end for attaching a fixed length strap;
a mechanism which allows motion in one direction only for moving the loading strap from the strap entry to the strap exit, wherein the mechanism comprises:
at least one idler; and
a drive assembly;
wherein the drive assembly comprises a drive wheel driven by a handle and spaced from the at least one idler to allow the load strap to pass between the drive wheel and the at least one idler; and
wherein the at least one idler comprises four idler gears surrounding the drive wheel.

11. The device of claim 10, wherein the drive assembly comprises a ratchet assembly.

12. The device of claim 11, wherein the mechanism further comprises a lock and release assembly.

13. The device of claim 12, wherein the lock and release mechanism comprises a locking handle moveable to engage and disengage the ratchet assembly.

14. The device of claim 13, wherein the locking handle includes a cam surface to interact with the ratchet assembly to engage and disengage the ratchet.

\* \* \* \* \*